US007269137B2

(12) United States Patent
Bizet et al.

(10) Patent No.: US 7,269,137 B2
(45) Date of Patent: Sep. 11, 2007

(54) METHOD FOR SETTING UP AN ISOCHRONOUS DATA STREAM CONNECTION, WITH THE APPLICATION OF A PREDETERMINED, TOTAL ISOCHRONOUS DELAY ON ONE OR MORE ROUTING PATHS

(75) Inventors: Stéphane Bizet, Rennes (FR); Laurent Frouin, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1132 days.

(21) Appl. No.: 10/216,782

(22) Filed: Aug. 13, 2002

(65) Prior Publication Data

US 2003/0053466 A1    Mar. 20, 2003

(30) Foreign Application Priority Data

Aug. 24, 2001  (FR)  ................................... 01 11115
Jul. 18, 2002  (FR)  ................................... 02 09159

(51) Int. Cl.
*H04L 12/26* (2006.01)

(52) U.S. Cl. ................... 370/230.1; 370/285; 370/362; 370/402

(58) Field of Classification Search ............. 370/230.1, 370/231, 235, 285, 362, 364, 400–402; 710/100, 710/107, 118, 305, 306, 310
See application file for complete search history.

(56) References Cited

U.S. PATENT DOCUMENTS

| 5,623,483 | A | * | 4/1997 | Agrawal et al. | ............. 370/253 |
| 6,032,261 | A | | 2/2000 | Hulyalkar | ................... 713/400 |
| 6,445,711 | B1 | * | 9/2002 | Scheel et al. | ................ 370/402 |
| 6,631,415 | B1 | * | 10/2003 | James et al. | ................. 709/227 |
| 6,728,821 | B1 | * | 4/2004 | James et al. | ................. 710/306 |
| 6,778,543 | B1 | * | 8/2004 | Frouin et al. | ................ 370/402 |
| 6,813,282 | B1 | * | 11/2004 | Domon | ........................ 370/516 |
| 2003/0078063 | A1 | * | 4/2003 | Legallais et al. | ........... 455/509 |

FOREIGN PATENT DOCUMENTS

| EP | 0 837 519 A2 | 4/1998 |
| EP | 1 087 581 A2 | 3/2001 |
| WO | WO 01/42877 A2 * | 6/2001 |

\* cited by examiner

*Primary Examiner*—Wing Chan
*Assistant Examiner*—Nguyen Ngo
(74) *Attorney, Agent, or Firm*—Fitzpatrick, Cella, Harper & Scinto

(57) ABSTRACT

Method for setting up an isochronous data stream connection between at least one entry terminal or talker and at least one addressee terminal or listener connected by at least one bridge of a digital bus networ. At least some of the bridges are associated with an isochronous delay that is parametrizable and the method comprises the following steps: (a) obtaining at least one routing path comprising one or more bridges, including at least one bridge with parametrizable isochronous delay; (b) for each bridge included in the at least one routing path, obtaining the value or possible values of the isochronous delay of the bridge; (c) for at least one bridge with parametrizable isochronous delay included in the at least one routing path, selecting the value that must be taken by the isochronous value of the bridge, so that the stream connection taking the at least one routing path incurs a predetermined total isochronous delay; (d) for the at least one bridge with parametrizable isochronous delay included in the at least one routing path, adapting and instantiating at least one resource of the bridge, so that the parametrizable isochronous delay of the bridge takes said selected value.

34 Claims, 15 Drawing Sheets

| Bus ID | Net Node | Route | Bandwidth |
|---|---|---|---|
| 0 | | | |
| . | . | . | . |
| . | . | . | . |
| . | . | . | . |
| ID (110) | ID (202) | R(213,214) | BDW |
| . | . | . | . |
| . | . | . | . |
| . | . | . | . |
| 0x3E | | | |

Figure 8

METHOD FOR SETTING UP AN ISOCHRONOUS DATA STREAM CONNECTION, WITH THE APPLICATION OF A PREDETERMINED, TOTAL ISOCHRONOUS DELAY ON ONE OR MORE ROUTING PATHS

BACKGROUND OF THE INVENTION

Field of the Invention

The field of the invention is that of digital bus networks, of the type comprising a plurality of digital buses to which terminals may be connected.

Such networks enable the interconnection of audio and/or video, analog and/or digital type terminals (also called devices) so that they may exchange audiovisual signals. The terminals belong, for example, to the following list of equipment (which is not exhaustive): television receivers (using satellite, RF channels, cable, xDSL and other means), television sets, video tape recorders, scanners, digital cinema cameras, digital cameras, DVD readers, computers, personal digital assistants (PDAs), printers, etc.

The invention can be applied especially but not exclusively to IEEE 1394 type digital bus networks. It may be recalled that the IEEE 1394 standard is described in the following reference documents: "IEEE Std 1394-1995, Standard for High Performance Serial Bus and "IEEE Std 1394a-2000, Standard for High Performance Serial Bus (Supplement)". A third document "IEEE P1394.1 Draft 0.17 Standard for High Performance Serial Bus bridges" describes the way to connect different IEEE 1394 type buses.

More specifically, the invention relates to a method for setting up an isochronous data stream connection between at least one entry terminal or talker and at least one addressee terminal or listener within a network of digital buses.

It may be recalled that, conventionally, a digital bus network is homogeneous. The digital buses are interconnected through homogeneous bridges. Each homogeneous bridge has a first portal and a second portal, one of the digital buses being connected to each of these portals. Each bridge is used to transfer packets from a bus connected to its first portal to another bus connected to its second portal.

With each bridge, there is an associated isochronous delay (the word "delay" being defined as a "period of time") for each direction of crossing from one of these portals to the other. This isochronous delay represents the period of time needed for the bridge to make an isochronous packet pass from one of its portals to the other.

The isochronous delay is used chiefly to convey isochronous packets (also called CIPs or common isochronous packets) in the network. A CIP contains a piece of information on absolute time indicating the time at which the packet has to be consumed by the addressee application. This timing information is computed by the isochronous initiator for a packet transferred on a single bus (the entry terminal or "talker" and the addressee terminal or "listener" are connected to the same digital bus). When there are several bridges between the "talker" or entry terminal and the "listener" or addressee terminal, it may be that the information contained in the CIP can no longer be up to date, owing to the latency introduced by the crossing of the bridges. In order to prevent this situation, each bridge between the talker terminal and the listener terminal increases the timing information, contained in the CIP packet, with the isochronous delay proper to this bridge (the transfer time between the two buses interconnected by this bridge).

At present, according to the above-mentioned standards in the case of the IEEE 1394 bus, each bridge is associated, for each crossing direction, with a constant isochronous delay. In other words, all the isochronous packets transferred through the bridge from one bus to another are processed with the same isochronous delay whatever the stream to which they belong.

One particular embodiment of the present invention is concerned also with a new type of digital bus network called a heterogeneous network because the digital buses therein are interconnected either directly, through homogeneous bridges as mentioned above, or through at least one switched network through heterogeneous bridges.

Each heterogeneous bus has a first portal to which one of the digital buses is connected and a second portal to which the switched network is connected. The switched network has a plurality of nodes connected to one another by plurality of links. These links are for example of the type used for two-way data transfers, according to the IEEE 1355 standard. It may be recalled that the IEEE 1355 standard is defined by the reference Std 1355-1995 Standard for Heterogeneous InterConnect (HIC) (Low Cost Low Latency Scalable Serial Interconnect) (aka ISO/IEC 14575 DIS).

A heterogeneous network of this kind works as follows: a connection is set up through one or more bridges and possibly through the switched network between a first terminal (entry terminal or talker) connected to a first digital bus that wishes to receive audiovisual signals and a second terminal (addressee terminal or listener) connected to a second digital bus that can give it the signals.

The term "entry terminal" or "talker" is understood to mean for example a digital camera, a digital cinema camera, digital cinema cameras, a digital output DVD reader or any analog device seen through an analog/digital converter.

The (homogenous or heterogeneous) network of digital buses is for example a home audiovisual network enabling especially the real-time exchange of animated images for distribution within a dwelling. If it is a heterogeneous type network, it comprises for example for high bit rate switched network.

We shall now present several major drawbacks of the prior art, related to the fact that, at present, and in accordance with the above-mentioned standards in the case of the IEEE 1394 bus, each bridge must be associated for each crossing direction with a constant isochronous delay.

This obligation means that it is impossible to choose the total isochronous delay undergone by the isochronous data stream in traveling through the routing path between the talker and the addressee terminal. Indeed, the total isochronous delay is the sum of the isochronous delays of the different successive bridges included along the included along the routing path. Since the isochronous delays of the bridges have to be constant, the total isochronous delay incurred by the stream is constant and imposed on it.

Now, there is an existing need to be able to choose the total isochronous delay, especially for applications such as supplying a new listener with information that has to be synchronized with a previously set-up stream whose delays are different.

The problem raised by the synchronization of the instant of arrival at numerous terminals is a new one. Indeed, at present, it is impossible to ensure that one and the same stream (coming from a single talker) can be received simultaneously by several listeners. In this case, the stream connection takes several routing paths in parallel, each between the talker and one of the listeners. Now, as explained here above, the total isochronous delay incurred by the stream on each routing path is constant and imposed. Since the different routing path is generally comprise neither the same bridges not the same number of bridges, there is no reason for their respective total isochronous delays to be equal.

Thus, for example, it is impossible at present, in a digital bus network, for loudspeakers (listeners) to receive stereophonic data coming from a talker at the same time, in a synchronized way.

Furthermore, it happens to be the case that the above-mentioned model of a constant isochronous delay for a bridge, irrespectively of the stream, is applicable only to a homogeneous bridge. It cannot be applied to a heterogeneous bridge. In other words, the above-mentioned model can be applied only if the network of digital buses is homogeneous and is therefore not appropriate to a heterogeneous digital bus network which is the point of interest in one alternative embodiment of the present invention.

Indeed, in the above-mentioned model, it is assumed that the transportation time on the buses is constant and most usually negligible. This is verified in the case of a homogeneous network comprising only digital buses. However, in the case of a heterogeneous network, the switched network is seen, by any terminal whatsoever connected to a digital bus, like any other digital bus whatsoever. However, the problem arises out of the fact that the transfer time on the switched network, unlike the transfer time on a "true" bus, is not constant. Indeed, it generally varies from one stream to another since the routing path through the switched network may be different from one stream to another. Furthermore, the transfer time on the switched network is generally not negligible.

SUMMARY OF THE INVENTION

It is a goal of the invention especially to overcome these different drawbacks of the prior art.

More specifically, one of the goals of the present invention is to provide a method for the setting up of an isochronous data stream connection within a digital bus net, that enables the choice of the total isochronous delay incurred by the isochronous data stream in traveling through the routing path between the talker and the listener or listeners.

It is also a goal of the invention to provide a method of this kind that make it possible, in the case of an isochronous data stream connection between a talker and several listeners, to have one and the same total isochronous delay on each of the routing paths to the different listeners.

It is another goal of the invention to provide a method of this kind that can be implemented with a digital bus net, of both the homogenous and the heterogeneous types.

An additional goal of the invention is to provide a method of this kind by which is possible, if it is implemented with a heterogeneous digital bus network comprising a switched network, to take account of a delay (variable from one stream to another) introduced by the passage of the stream in the switched network.

These different goals as well as others which shall appear here below are achieved according to the invention by means of a method for setting up an isochronous data stream connection between at least one entry terminal or talker and at least one addressee terminal or listener connected by at least one bridge of a digital bus network comprising a plurality of digital buses interconnected by a plurality of bridges, each bridge being associated with an isochronous delay, at least some of said bridges are associated with an isochronous delay that is parametrizable within a range of predetermined values, and said method comprises the following steps:

(a) obtaining at least one routing path between said at least one talker terminal and said at least one listener terminal, comprising one or more bridges, including at least one bridge with parametrizable isochronous delay;

(b) for each bridge included in said at least one routing path, obtaining the value or possible values of the isochronous delay of said bridge;

(c) for at least one bridge with parametrizable isochronous delay included in said at least one routing path, selecting the value, called a selected value, that must be taken by the isochronous value of said bridge, so that said stream connection taking said at least one routing path incurs a predetermined total isochronous delay;

(d) for said at least one bridge with parametrizable isochronous delay included in said at least one routing path, adapting and instantiating at least one resource of said bridge, so that the parametrizable isochronous delay of said bridge takes said selected value.

The general principle of the invention therefore consists of the use of at least one novel type of bridge, namely a bridge with parametrizable isochronous delay. In this way, it is possible to choose a predetermined total isochronous delay to be applied to a given stream when it travels through a given routing path between a talker and a listener. This predetermined total isochronous delay is therefore not imposed, unlike that of the prior art (see above discussion). It is all the more easily chosen and its range of values is all the greater as the number of bridges with parametrizable isochronous delay is great. In a particular embodiment, all the bridges are parametrizable isochronous delay bridges.

It will also be noted that the choice, for a bridge, of an isochronous delay with a high value enables the use of the memory of this bridge as a preferred bufferization means in the net.

In a particular embodiment of the invention, an isochronous data stream connection is set up between a talker terminal and at least two listener terminals and wherein said method comprises the following steps:
for each of said at least two listener terminals, obtaining a routing path comprising one or more bridges, including at least one bridge with parametrizable isochronous delay, between said at least one talker terminal and said listener terminal;

for each of said at least two routing paths, performing said steps (b) to (d), so that said stream connection incurs a same predetermined total isochronous delay on each of said at least two routing paths that it takes.

Thus, one and the same total isochronous delay can be applied to a stream taking several routing paths in parallel. Thus, data sent out by a talker may be received in a synchronized way by several listeners.

It is known that a wrong positioning of acoustic chambers in a system known as a "surround" system generates time lags between the sound signals (of the order of 1 ms for a wrong positioning of about 30 cm). If signals intended for this type of chamber are lagged by a different period depending on the path taken, the sound signals perceived by the user will be disturbed. A parametrizable delay according to the invention can be used to correct this problem. Preferably, said at least one adapted and instantiated resource is a FIFO memory included in said bridge with parametrizable isochronous delay.

The size of the FIFO memory is thus brought into play, if necessary to increase or reduce the parametrizable isochronous delay of this bridge. In one particular embodiment of the invention, the adaptation and instantiation of said at least one resource of each bridge with parametrizable isochronous delay included in said at least one routing path, is common to several streams so that the selected value of the of the parametrizable isochronous delay of said bridge is applied to each of said streams by said bridge.

Thus, once the parametrizable isochronous delay of a bridge has been adjusted for a given crossing direction and takes a given value in the range of possible values, it keeps this given value up till the next modification (for example following a reset of the bridge or the reception by the bridge of a command to update its parametrizable isochronous delay). Up till the next modification, the bridge applies this given value of the parametrizable isochronous delay to all the successive streams that cross it. According to an advantageous variant, the adaptation and instantiation of said at least one resource of each bridge with parametrizable isochronous delay included in said at least one routing path, is proper to a particular stream so that the selected value of the parametrizable isochronous delay of said bridge is applied solely to said particular stream by said bridge.

Thus, the bridge manages several parametrizable isochronous delays and selectively applies each of them to a particular stream, independently of the other managed streams. A new parametrizable isochronous delay is assigned to each stream crossing the bridge.

Advantageously, said digital buses are IEEE 1394 type digital buses.

Advantageously, said network of digital buses is a home audiovisual network.

A home audiovisual network of this kind can be used for example for the real-time exchange of moving images or sound files in a dwelling. Preferably, said steps (a) to (c) are performed by a device to control the setting up of a stream connection, connected to said digital bus net. Advantageously, comprising a step to obtain a description of the network, and during said step (a), said description of the network is used to obtain the bridges of each routing path.

Advantageously, implemented for each crossing direction of each bridge included in said at least one routing path.

Advantageously, said digital bus network is a homogeneous network the digital buses being interconnected directly through homogeneous bridges, each comprising a first portal and a second portal, to each of which one of the digital buses is connected, and said at least one routing path between said at least one talker terminal and said at least one listener terminal, comprises at least one homogeneous bridge with parametrizable isochronous delay.

Advantageously, said digital bus network is a heterogeneous network, the digital buses being interconnected:

either directly, through homogeneous bridges each comprising a first portal and a second portal, to each of which one of the digital buses is connected;

or through at least one switched network, through heterogeneous bridges, each comprising a first portal, to which one of the digital buses is connected, and a second portal, to which the switched network is connected, the switched network comprising a plurality of nodes interconnected by a plurality of links, each heterogeneous bridge forming one of the nodes of the switched network;

said at least one routing path, between said at least one talker terminal and said at least one listener terminal, crosses the switched network and comprises at least one pair of heterogeneous bridges, respectively forming entry and exit nodes of the switched network and, possibly, at least one homogeneous bridge, and said at least one routing path comprises at least one heterogeneous bridge with parametrizable isochronous delay and/or at least one homogeneous bridge with parametrizable isochronous delay, each taking account, in its parametrizable isochronous delay, in a determined proportion, of a delay introduced by the passage of the stream in the switched network.

According to an advantageous characteristic, the delay introduced by the passage of the stream in the switched network is taken into account:

in a first proportion P1 in the parametrizing isochronous delay of one of said heterogeneous bridges forming an entry node of the switched network;

in a second proportion P2 in the parametrizing isochronous delay of the other of the heterogeneous bridges forming an exit node of the switched network;

with the sum of the first and second proportions being substantially equal to 100% (P1+P2=100%).

Preferably, said first and second proportions are both substantially equal to 50% (P1=P2=50%).

Preferably, the delay obtained by the passage of the stream in the switched network is obtained in taking account of the routing path through the switched network.

Thus, the invention takes account of the delay introduced by the crossing of each of the nodes located on that part of the routing path of the stream which is included in the switched network, so as to obtain the most precise estimation possible of the transfer time of the stream within the switched network.

Preferably, the delay $D_{switched\ network}$ introduced by the passage of the stream in the switched network is computed by the following formula:

$$D_{switched\ network} = N_{intermediate\ nodes} \times D_{switching}$$

with $N_{intermediate\ nodes}$ being the number of intermediate nodes in the part of the routing path included in the switched net, and $D_{switching}$ being the mean switching time per intermediate node.

According to one variant, the delay introduced by the passage of the stream in the switched network is estimated by a predetermined value, without taking account of the routing path of the stream through the switched network.

A choice of this kind may be arbitrary choice, or for example may be fixed on an a priori basis by the constructor of the heterogeneous bridges, depending on results of tests or simulations. Preferably, said at least one adapted and instantiated resource is a FIFO memory included in said bridge with parametrizable isochronous delay, and the selected value of the parametrizable isochronous delay, $D_{isochronous}$, of said at least one heterogeneous bridge with parametrizable isochronous delay is computed according to the following formula:

$$D_{isochronous} = (P\% \times D_{switched\ network}) + D_{crossing\ FIFO} + D_{bridge\ processing}$$

with:

P % the proportion in which said heterogeneous bridge takes account, in its parametrizable isochronous delay, of the delay introduced by the passage of the stream in the switched network, $D_{switched\ network}$ the delay introduced by the passage of the stream in the switched network, $D_{FIFOcrossing}$ the time taken for the crossing, by the stream, of the FIFO memory included in said heterogeneous bridge with parametrizable isochronous delay, $D_{bridge\ processing}$ the time taken for the transfer of an element of the stream, within said heterogeneous bridge with parametrizable isochronous delay, from the FIFO memory to an interface of the digital bus, or vice versa.

Here below, a distinction is made between two embodiments of the invention in the case of a heterogeneous digital bus network.

According to a first advantageously embodiment of the invention, in the case of a heterogeneous digital bus network, the size of said FIFO memory is adapted so that the selected value of the parametrizable isochronous delay, $D_{isochronous}$, is smaller than or equal to and as close as possible to a reference value, $D_{reference\ isochronous}$, whatever the value of the delay introduced by the passage of the stream in the switched network.

It is thus ensured that the isochronous delay of this heterogeneous bridge is substantially constant, whatever the stream considered. The heterogeneous network, in this first embodiment of the invention, therefore verifies the prescriptions of the "Standard for High Performance Serial Bus bridges" mentioned here above. The reference value is a maximum value corresponding to the longest path through the switched network.

In other words, the invention plays on the value of the FIFO memory crossing time, $D_{FIFO\ crossing}$, to compensate for the variation from one flux to another of the delay related to the passage of the stream in switched network, $D_{switched\ network}$. The principle here is as follows: if the isochronous delay before adaptation is smaller than the reference value, the FIFO memory of the heterogeneous bridge is modified so as to increase its isochronous delay up to a value close to and smaller than or equal to the reference value; if the isochronous delay before adaptation is greater then the reference value, the setting up of a stream connection is rejected, for the sake of compliance with the above standard.

Preferably, according to this first embodiment, said FIFO memory possessing a size $L_{original\ FIFO}$ before adaptation such that: $L_{original\ FIFO} = \Delta + X$ with $\Delta$ being a first part of the FIFO memory before adaptation, called an original threshold, and X being a second part of the FIFO memory before adaptation, by which it is possible to counter the network jitter, said FIFO memory possesses a size $L_{adapted\ FIFO}$ after adaptation such that:

$$L_{adaptedFIFO} = \Delta' + X$$

with $\Delta'$ as a first part of the FIFO memory after adaptation, such that: $\Delta' = \Delta + \delta$, with $\Delta$ as said original threshold,
and $\delta$ as the greatest integer such that: $\delta \leq \delta_{max}$ avec $\delta_{max} = BitRate_{stream} \times (D_{reference\ isochronous} - D_{original\ isochronouos\ origine})$ where $BitRate_{stream}$ is the bit rate of the stream, $D_{reference\ isochronous}$ is the reference value of the parametrizable isochronous delay, $D_{original\ isochronous}$ is the isochronous delay before adaptation, and X is a second part of the FIFO memory after adaptation, identical to said second part of the FIFO memory before adaptation, by which it is possible to counter the network jitter.

Conventionally, $\Delta = X$ is chosen so that $L_{original\ FIFO} = 2\Delta$.

Increasing the original threshold $\Delta$ of the FIFO to a threshold $\Delta'$ thus increases the time needed for a packet to cross the FIFO memory of the heterogeneous bridge considered. The isochronous delay associated with this bridge is therefore increased, thus making it is substantially equal (namely smaller than or equal to or as close as possible to) the reference value.

According to a second advantageous embodiment of the invention, also in the case of a heterogeneous digital bus network, the size of said FIFO memory is fixed, so that the selected value of the parametrizable isochronous delay, $D_{isochrone}$, is a function of the value of the delay introduced by the passage of the stream in the switched network.

Unlike the first embodiment described here above, the second embodiment of the invention does not comply with the "Standard for High-Speed Serial Bus bridges", but has the advantage of consuming less memory.

The main difference between this second embodiment of the invention and the first embodiment described here above is that the goal of this second embodiment is not to apply a constant isochronous delay for every stream crossing a heterogeneous bridge. On the contrary, the isochronous delay incurred by isochronous packets crossing a heterogeneous bridge is dependent, in this second embodiment, on the stream to which they belong. Such dependence is chiefly related to the routing paths taken by the packets within the switched network (namely the number of intermediate nodes located along this routing paths), the jitter of the switched network and the bit rate of the stream.

According to an advantageous characteristic of this second embodiment, the step (d) is followed by the following step:

(e) in said at least one heterogeneous bridge, memorizing the selected value of the parametrizable isochronous delay, in association with the stream for which the setting up of a connection necessitates the selection of said selected value.

This kind of storage of the computed isochronous delays, in relation with the stream with which they are associated, enables them to be subsequently re-utilized, if necessary, by the heterogeneous bridge considered.

Advantageously, according to this second embodiment, in the case of a processing of a CIP included in a stream, said at least one heterogeneous bridge with parametrizable isochronous delay performs the following steps:

the identification of the stream in which the CIP is contained;

the reading, in a memory, of an isochronous delay, computed beforehand and stored in association with the identified stream;

the use of the isochronous delay read to process the CIP.

It is therefore not necessary to recompute the original isochronous delay associated with the stream to which the CIP belongs, this delay having been stored, for example in association with the identifier of the stream, and being capable of being advantageously reused by the heterogeneous bridge.

According to a first advantageous variant of this second embodiment, in the case of a processing of a request for the reading of the isochronous delay, said at least one heterogeneous bridge with parametrizable isochronous delay carries out the following steps:

the heterogeneous bridge tries to read the read request and especially a stream identifier that may be included in the request;

if the read request contains a stream identifier, and if the stream identifier indicates a stream that is in the process of being managed by the heterogeneous bridge, then the heterogeneous bridge reads, in a memory, an isochronous delay computed beforehand and stored in association with the identified stream, and then sends a response containing the isochronous delay read.

According to a second advantageous variant of this second embodiment, in the case of a processing of a request for the reading of the isochronous delay, said at least one heterogeneous bridge with parametrizable isochronous delay carries out the following steps:

the heterogeneous bridge tries to read the read request and especially a stream identifier that may be included in the request;

if the read request contains a stream identifier, and if the stream identifier indicates a stream that is not in the process of being managed by the heterogeneous bridge, or if the read request does not contain a stream identifier, then the heterogeneous bridge tries to identify computation elements, within the read request, that are indispensable to the computation of an isochronous delay;

if the read request contains the computation elements, the heterogeneous computes an isochronous delay, stores it in association with the identified stream and then sends a response containing the isochronous delay computed.

Such a computation of the original isochronous delay takes account especially of the delay introduced by the passage of the stream along the routing path, the delay of the crossing, by the stream, of an original FIFO memory included in the given heterogeneous bridge and used for the given crossing direction, and the transfer delay, within the heterogeneous bridge, of an element of the stream, from the FIFO memory to a digital bus interface or vice versa as described above in this document.

According to a third advantageous variant of this second embodiment, in the case of a processing of a request for the reading of the isochronous delay, said at least one heterogeneous bridge with parametrizable isochronous delay carries out the following steps:

the heterogeneous bridge tries to read the read request and especially a stream identifier that may be included in the request;

if the read request contains a stream identifier, and if the stream identifier indicates a stream that is not in the process of being managed by the heterogeneous bridge, or if the read request does not contain a stream identifier, then the heterogeneous bridge tries to identify computation elements, within the read request, that are indispensable to the computation of an isochronous delay;

if the read request does not contain the computation elements, the heterogeneous bridge chooses an isochronous delay having a predetermined value, stores it in association with the identified stream and then sends a response containing the isochronous delay chosen.

An original isochronous delay of this kind may then result from an arbitrary choice or may be fixed on an a priori basis by the constructor of the bridge.

According to a fourth advantageous variant of this second embodiment, in the case of a processing of a request for the reading of the isochronous delay, said at least one heterogeneous bridge with parametrizable isochronous delay carries out the following steps:

the heterogeneous bridge tries to read the read request and especially a stream identifier that may be included in the request;

if the read request contains a stream identifier, and if the stream identifier indicates a stream that is not in the process of being managed by the heterogeneous bridge, or if the read request does not contain a stream identifier, then the heterogeneous bridge tries to identify computation elements, within the read request, that are indispensable to the computation of an isochronous delay;

if the read request does not contain the computation elements, the heterogeneous sends a response containing an error identifier According to a first advantageous characteristic of this second embodiment, in the case of a processing of a request for setting up a stream connection, said at least one heterogeneous bridge with parametrizable isochronous delay carries out the following steps:

the heterogeneous bridge tries to read the stream connection set-up request, and especially a stream identifier that may be included in the request;

if the stream connection set-up request contains a stream identifier, if the stream identifier indicates a stream for which the heterogeneous bridge has generated a response beforehand to a request for reading the isochronous delay, and if the isochronous delay contained in the response generated beforehand can be read, then the heterogeneous bridge reads the isochronous delay computed beforehand and stored in association with the identified stream, and then authorizes the setting up of a connection with the isochronous delay read.

According to a second advantageous characteristic of this second embodiment, in the case of a processing of a request for setting up a stream connection, said at least one heterogeneous bridge with parametrizable isochronous delay performs the following steps:

the heterogeneous bridge tries to read the stream connection set-up request, and especially a stream identifier that may be included in the request;

if the stream connection set-up request contains a stream identifier, if the stream identifier indicates a stream for which the heterogeneous bridge has generated a response beforehand to a request for reading the isochronous delay, and if the isochronous delay contained in the response generated beforehand cannot be read, then the heterogeneous bridge computes an isochronous delay, stores it in association with the identified stream, and then authorizes the setting up of a connection with the isochronous delay computed.

According to a third advantageous characteristic of this second embodiment, in the case of a processing of a request for setting up a stream connection, said at least one heterogeneous bridge with parametrizable isochronous delay performs the following steps:

the heterogeneous bridge tries to read the stream connection set-up request, and especially a stream identifier that may be included in the request;

if the stream connection set-up request contains a stream identifier, if the stream identifier indicates a stream for which the heterogeneous bridge has generated a response beforehand to a request for reading the isochronous delay, and if the isochronous delay contained in the response generated beforehand cannot be read, then the heterogeneous bridge rejects the setting up of a connection.

According to a fourth advantageous characteristic of this second embodiment, in the case of a processing of a request for setting up a stream connection, said at least one heterogeneous bridge with parametrizable isochronous delay performs the following steps:

the heterogeneous bridge tries to read the stream connection set-up request, and especially a stream identifier that may be included in the request;

if the stream connection set-up request contains a stream identifier, if the stream identifier indicates a stream for which the heterogeneous bridge has not computed an isochronous delay beforehand, then the heterogeneous bridge computes an isochronous delay, stores it in association with the identified stream, and then authorizes the setting up of a connection with the isochronous delay computed.

The invention also relates to a computer program comprising sequences of instructions adapted to the implementation of a method according to any of the previous claims when said program is executed on a computer.

The invention also relates to a computer program product for setting up an isochronous data stream connection between at least one entry terminal or talker and at least one addressee terminal or listener connected by at least one bridge of a digital bus network comprising a plurality of digital buses interconnected by a plurality of bridges, each bridge being associated with an isochronous delay, at least some of said bridges being associated with an isochronous delay that is parametrizable within a range of predetermined values, said computer program product comprising program code instructions recorded on a support that can be used in a computer comprising computer-readable programming means to perform the following steps:

(a) obtaining at least one routing path between said at least one talker terminal and said at least one listener terminal, comprising one or more bridges, including at least one bridge with parametrizable isochronous delay;

(b) for each bridge included in said at least one routing path, obtaining the value or possible values of the isochronous delay of said bridge;

(c) for at least one bridge with parametrizable isochronous delay included in said at least one routing path, selecting the value, called a selected value, that must be taken by the isochronous value of said bridge, so that said stream connection taking said at least one routing path incurs a predetermined total isochronous delay;

(d) for said at least one bridge with parametrizable isochronous delay included in said at least one routing path, adapting and instantiating at least one resource of said bridge, so that the parametrizable isochronous delay of said bridge takes said selected value.

The invention also relates to a bridge of a digital bus network, of the type associated with an isochronous delay, wherein the bridge is associated with a parametrizable isochronous delay in a range of predetermined values, and the bridge comprises:

means for the reception of a selected value of said parametrizable isochronous delay, said selected value being such that an isochronous data stream connection, set up between at least one entry terminal and at least one destination terminal, and taking at least one routing path comprising said bridge, incurs a predetermined total isochronous delay;

means for the adaptation and instantiation of at least one of its resources so that said parametrizable isochronous delay takes said selected value.

The invention also relates to a device to control the setting up of an isochronous data stream connection between at least one entry terminal or talker and at least one addressee terminal or listener connected by at least one bridge of a digital bus network comprising a plurality of digital buses interconnected by a plurality of bridges, each bridge being associated with an isochronous delay, at least some of said bridges being associated with an isochronous delay that is parametrizable within a range of predetermined values, said control device comprises:

first means to obtain at least one routing path between said at least one talker terminal and said at least one listener terminal, comprising one or more bridges, including at least one bridge with parametrizable isochronous delay;

seconds means to obtain the value or possible values of the isochronous delay of each bridge included in said at least one routing path;

means for the selection, for at least one bridge with parametrizable isochronous delay included in said at least one routing path, of the value, called a selected value, that must be taken by the isochronous delay of said bridge so that said stream connection taking said at least one routing path incurs a predetermined total isochronous delay;

means for the transmission of said selected value to said at least one bridge with parametrizable isochronous delay included in said at least one routing path, so that said at least one bridge with parametrizable isochronous delay adapts and instantiates at least one of its resources so that its parametrizable isochronous delay will take said selected value.

Advantageously, an isochronous data stream connection being set up between a talker terminal and at least two listener terminals, said device comprises:

first means to obtain, for each of said at least two listener terminals, a routing path comprising one or more bridges, including at least one bridge with parametrizable isochronous delay, between said at least one talker terminal and said listener terminal;

said seconds obtention, said selection means and said transmission means being such that, when they are used for each of said at least two routing paths, said stream connection incurs a same predetermined total isochronous delay on each of said at least two routing paths that it takes.

Advantageously, said at least one adapted and instantiated resource is a FIFO memory included in said bridge with parametrizable isochronous delay. Preferably, the adaptation and instantiation of said at least one resource of each bridge with parametrizable isochronous delay included in said at least one routing path, is common to several streams so that the selected value of the of the parametrizable isochronous delay of said bridge is applied to each of said streams by said bridge.

According to an advantageous variant, the adaptation and instantiation of said at least one resource of each bridge with parametrizable isochronous delay included in said at least one routing path, is proper to a particular stream so that the selected value of the parametrizable isochronous delay of said bridge is applied solely to said particular stream by said bridge.

Advantageously, said digital buses are IEEE 1394 type digital buses.

Advantageously, said network of digital buses is a home audiovisual network.

Advantageously, said device comprises means to obtain a description of the network, and said first means to obtain at least one routing path between said at least one talker terminal and said at least one listener terminal use said description of the network is used to obtain the bridges of each routing path.

Advantageously, said device can be used for each crossing direction of each bridge included in said at least one routing path.

BRIEF DESCRIPTION OF THE DRAWINGS

Other features and advantages of the invention shall appear more clearly from the following description of a preferred embodiment, given by way of a non-exhaustive illustration and from the appended drawings, of which:

FIG. 8 describes the structure of a routing table for the switched network contained in the heterogeneous network of FIG. 6;

MORE DETAILED DESCRIPTION

The invention therefore relates to a method for setting up an isochronous data stream connection between at least one entry terminal or talker and at least one addressee terminal or listener connected by at least one bridge of a digital bus network. This method is such that a predetermined total isochronous delay can be applied along at least one routing path between the (at least one) talker and the (at least one) listener.

Figure 1:
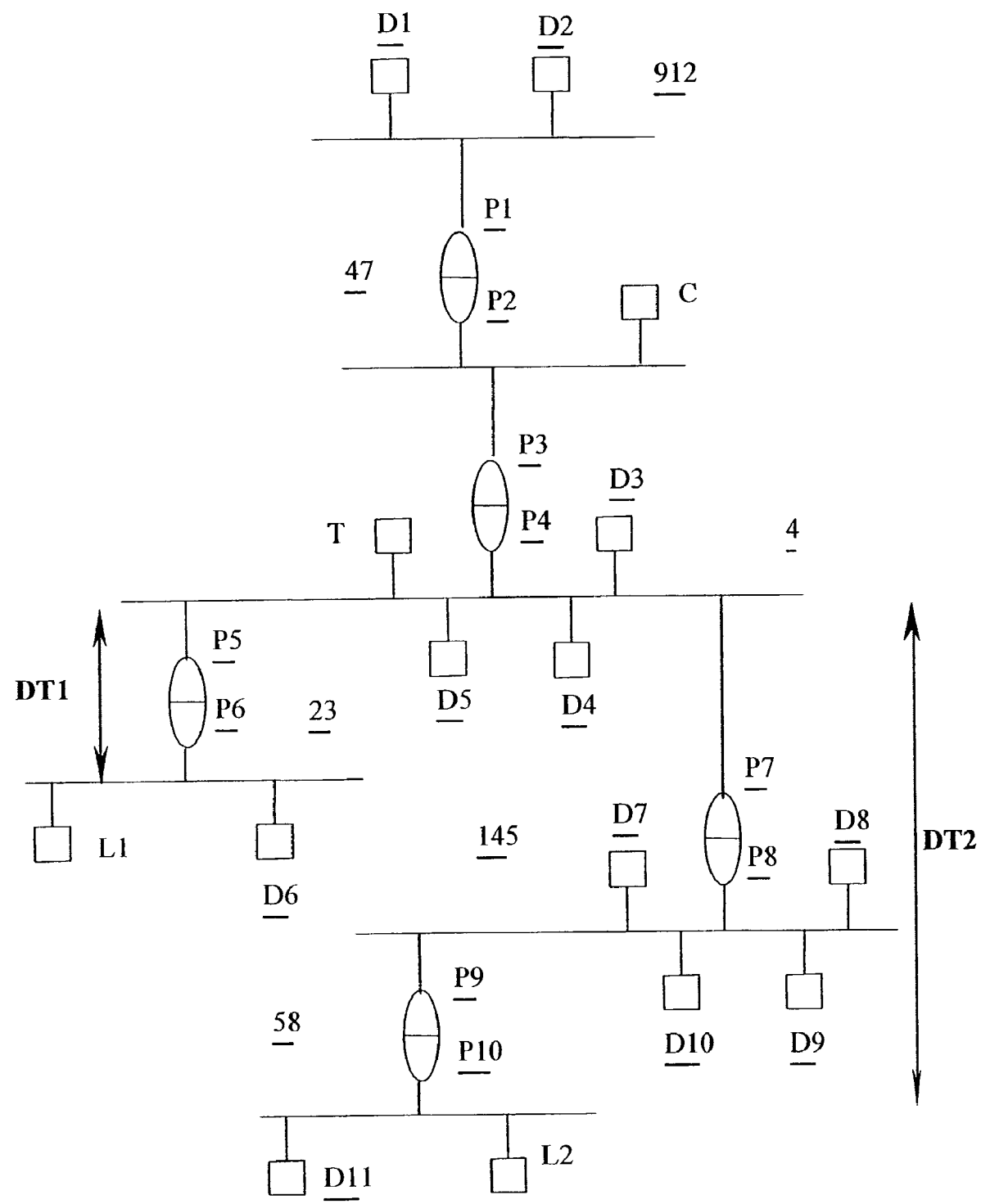
FIG. 1 shows an exemplary block diagram of a homogeneous network of digital buses, in which the method according to the invention can be implemented.

Referring to the block diagram of FIG. 1, we shall now present a homogeneous network of digital buses in which the method according to the invention can be implemented.

In this example, the homogeneous network is constituted by a plurality of IEEE 1394 type buses referenced 4, 23, 47, 58, 145 and 912, compliant with the first and second standards mentioned here above ("IEEE Std 1394-1995, Standard for High Performance Serial Bus" and "IEEE Std 1394a-2000, Standard for High Performance Serial Bus (Supplement)").

The buses are interconnected by homogeneous bridges compliant with the third standard mentioned here above "IEEE P1394.1 Draft 0.17 Standard for High Performance Serial Bus bridges". The bridges are referenced P1/P2, P3/P4, P5/P6, P7/P8, P9/P10, with Pi, i=1 to 10, representing a portal of an IEEE P1394 bridge.

Terminals or devices are connected to the IEEE 1394 buses. In this example, the buses referenced D1 to D11, T, L1 and L2 are compliant with the first and second standards mentioned here above, and the bus referenced C is compliant with the first, second and third standards mentioned here above.

The device referenced C is a "controller", namely a device in charge of controlling the setting up of isochronous data stream connections, as described in detail here below in the present description.

By way of an example, and as illustrated in FIG. 1, an description is given here below of the case of the setting up of an data stream connection between a talker T and two listeners L1, L2. The goal, when it is physically possible, is to make the total isochronous delay DT1 between the talker T and the first listener T1, equal to the total isochronous delay DT2 between the talker T and the second listener T2. The talker T is, for example, an A/V stream source. In this example, the terminals D1 to D11 are not concerned by this setting up of a stream connection.

Figure 2:
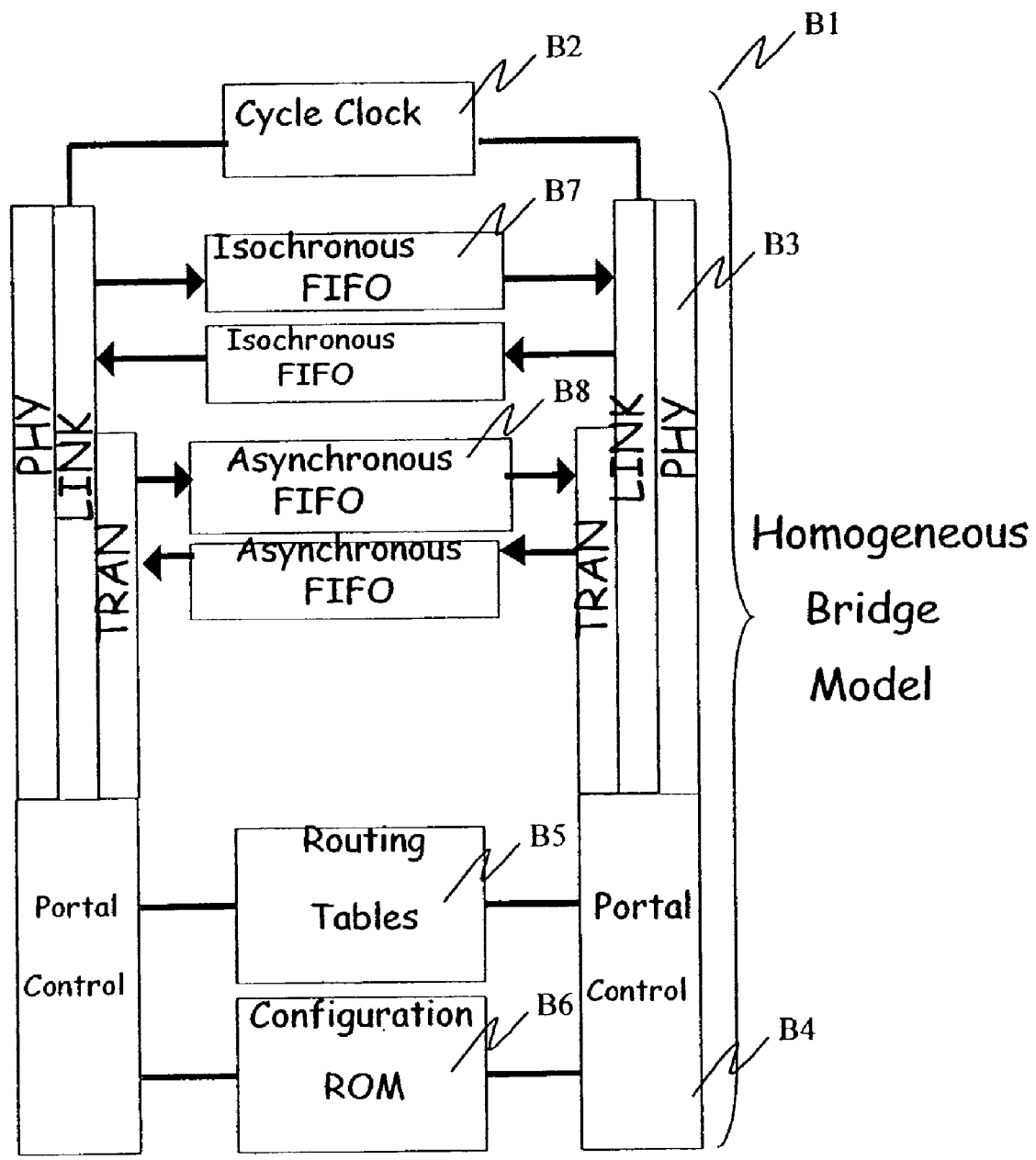
FIG. 2 illustrates an exemplary embodiment of a homogeneous bridge contained in the homogeneous network of FIG. 1.

FIG. 2 illustrates an exemplary structure of a homogeneous bridge referenced P1/P2, P3/P4, P5/P6, P7/P8, P9/P10 in FIG. 1.

A bridge of this kind has two portals and an internal structure for the processing of data in such a way that they can cross the bridge from an incoming bus to an outgoing (adjacent) bus. Each portal B4 comprises layers <<PHY>>, <<LINK>> and <<TRANSACTION>> as defined in the first, second and third standards mentioned here above.

The internal structure comprises:

stream routing and control tables B5, that enable the bridge to know which types of data packets will cross the bridge in each crossing direction;

a configuration ROM memory B6, that identifies its capacities (especially its isochronous delay, which maybe parametrizable, according to the present invention);

a clock B2 which enables the two portals of the bridge to be synchronized;

FIFO memories B8 dedicated to the asynchronous packets (whose processing is not the object of the present invention);

FIFO memories B7 dedicated to the isochronous packets (whose processing is the object of the present invention). There must be at least one FIFO for each crossing direction of each bridge capable of processing an isochronous traffic.

Figure 3:
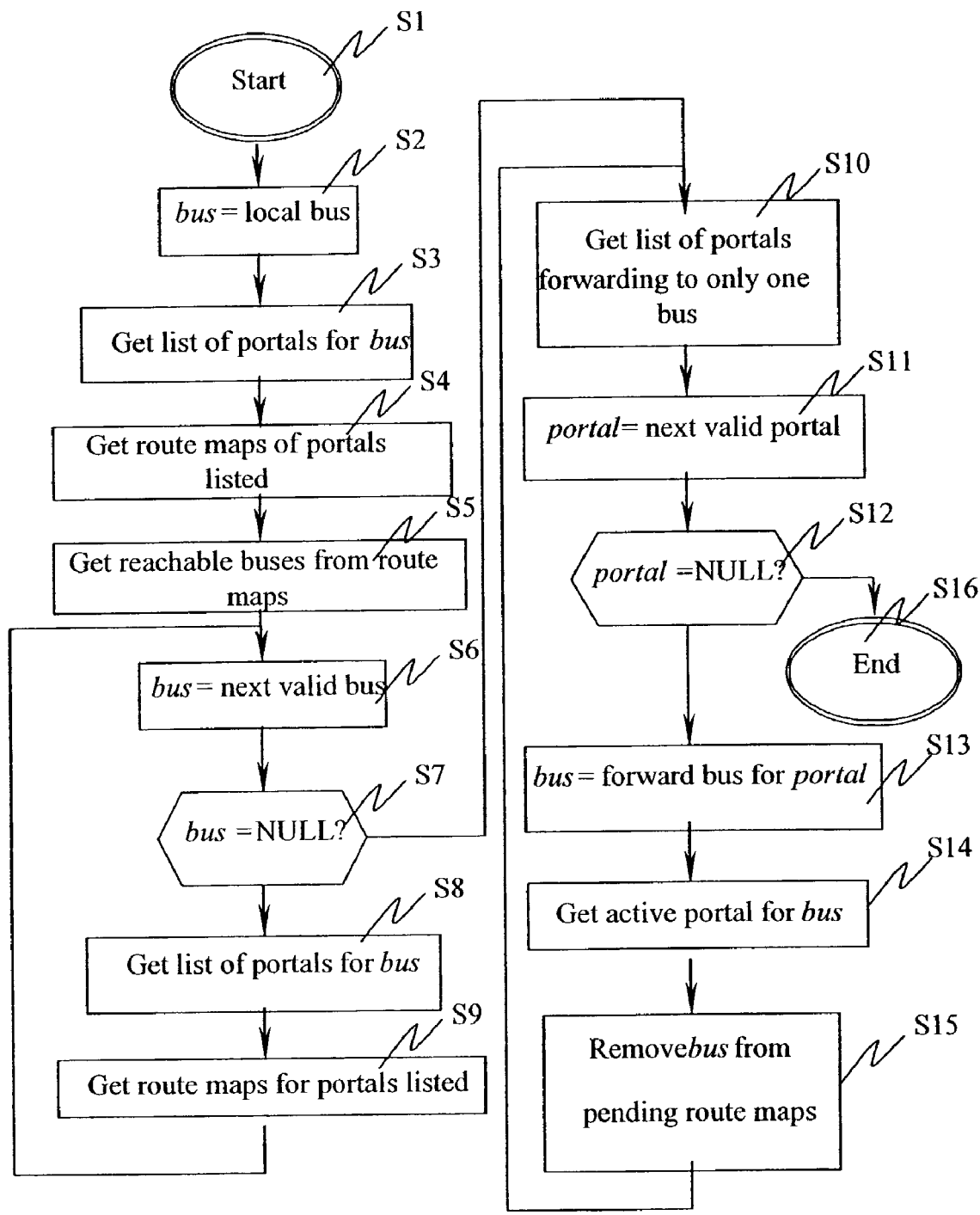
FIG. 3 shows an exemplary algorithm implemented by the controller contained in the homogeneous network of FIG. 1, in order to obtain a description of the homogeneous network of FIG. 1.

Referring now to FIG. 3, we shall present an exemplary algorithm implemented by the controller C of FIG. 1, in order to obtain a description of the homogenous network with which it is connected.

This algorithm is stored in the ROM of the controller C. It is loaded into the RAM of the controller C when the power is turned on and the central processing unit (CPU) of this controller will execute the corresponding instructions when the controller is newly connected to an IEEE 1394 bus.

The description of the network obtained by the controller by means of this algorithm consists of a list of bus and portal descriptors. This list can be updated when a change (the addition or elimination of a bridge) appears. The information on the change in the structure of the network is propagated on each bus of the network by the portals, when each portal is informed by its co-portal (namely the portal belonging to the same bridge). This route map updating action is achieved by an UPDATE ROUTES message defined in the third standard mentioned here above. Thus, the portal having its route map modified by its adjacent portal (or co-portal), following the reception of an UPDATE ROUTES message, generates a bus reset on its local bus and gives an indication, in its self-ID packet, that an important change has taken place in the network "behind" itself. A Self-ID packet is a packet sent by each IEEE 1394 terminal as defined in the first, second and third standards cited here above, providing an indication of whether the terminal is a bridge, which of its ports are connected, its node physical number, etc The purpose of this algorithm is to make it possible for the controller C to fill a net structure description such as (in pseudo C code):

```
:/* Net descriptor structure */
typedef std::list<*BusDescriptor> NetDescriptor;
/* Bus descriptor structure */
typedef struct BusDescriptor {
    unsigned int bus_ID;
    PortalDescriptorList portals;
```

-continued

```
} BusDescriptor;
/* Portal descriptor structure */
typedef std::list<*PortalDescriptor> PortalDescriptorList;
typedef struct PortalDescriptor {
    unsigned int reachable_bus[32]; /* one bit per bus ID */
    long long EUI64;
    unsigned int node_ID; /* IEEE1394 global node ID */
    PortalDescriptor *co_portal;
} PortalDescriptor;
```

At a step referenced S2, it is indicated that the information is obtained from devices of the local bus.

At a step referenced S3, the controller C identifies the portals of the bridge present at the local bus. This can be done by analysis of the Self-ID packets contained in the topology map control and status registers (i.e. the TOPOLOGY MAP CSRs). These CSRs are defined in the first and second standards mentioned here above. The self-ID packets of the devices compliant with the third standard mentioned here above contain a <<bridge>> field with specific values ("2" indicates that the device is a bridge portal, "3" indicates that a change has occurred in the net topology and "0" indicates that the device is not a bridge).

In the exemplary network illustrated in FIG. 1, the result of the operation performed at the step referenced S3 is: portals P2 and P3.

During a step referenced S4, the controller C obtains the route maps of the portals identified during the step referenced S3. This information is contained in the response packet containing the response to a "Read Block Request" sent to the route map CSR of the portal. The reachable buses are identified in the route map of a portal with FORWARD flag in correspondence with the bus ID. Actually, the route map register is a table with the bus identifiers as entries and the statuses as outputs. These statuses are VALID, FORWARD, CLEAN and DIRTY.

At this stage in the exemplary network shown in FIG. 1, the controller can fill the following parts of the network structure:

the net descriptor contains pointers to six bus descriptors (buses referenced 4, 23, 47, 58, 145, 912).

the bus descriptor for the bus 47 (local bus for the controller) contains "47" as the bus ID and a list of portals identifying P2 and P3 the bus descriptors for the buses 4, 23, 47, 58, 145, 912 contain respectively "4", "23", "47", "58", "145", "912" as bus_IDs and a (temporarily) empty list of portals the portal descriptor for the portal referenced P2 contains a piece of information indicating the bus 912 as a reachable bus; its EUI164 (unique identifier) which can be obtained from a response to a Read Block Request made to the bus information block or Bus Info Block of the portal in its configuration ROM; its global node ID as defined in the above-mentioned third standard and consisting of the bus ID of local bus and the virtual ID of the portal—these identifiers can be obtained respectively from a response to a "read quadlet request" addressed to the CLAN_INFO CSR register and a response to a "Read Block Request" addressed to the VIRTUAL_ID_MAP CSR of the portal (see the above-mentioned third standard for more details on the information available in these registers).

the portal descriptor for the portal referenced P3 contains information indicating the buses 4, 23, 58, 145 as reachable buses; its EUI64 (unique identifier); its global node ID.

The steps S5 to S9 will enable the controller C to fill all the fields of the net descriptor except for the one by which a portal can be associated with its adjacent or co-portal (the co-portal field of the portal descriptor). The filling of this field is obtained by the operations S10 to S15.

At the step S5, the controller C obtains the bus Ids used in the net from the route maps of the portals of its local bus. These are for example the bus IDs that are marked with the FORWARD flags in the route maps of the portals.

In the exemplary net considered in FIG. 1, the bus IDs are those of the buses referenced 4, 23, 58, 145, 912 (namely all the buses of the net except the bus 47).

Through the mechanism of the steps referenced S6 and S7, the steps referenced S8 and S9 are performed for each of the buses identified during the step referenced S5.

At the step S8, the controller C obtains the portals present at each bus identified during the step S5. This can be done for instance by sending "read quadlet requests" addressed to a "CSR destination offset" that is specific to IEEE 1394 bridges (CLAN_INFO for instance) for all the node IDs between 0 and 62 (63 being used for broadcasting on the bus 63). Once a bridge portal is identified (when there is no error response code in the response to the "read quadlet request": this means that the device to which the read request had been addressed is a bridge portal; if the response code indicates a ext_invalid_global_ID, the proxy (identified by the proxy_ID field in the response as defined in the third standard mentioned here above is then a bridge portal), the time spent on the action of the step S8 can be reduced by sending a "Read Block Request" to the VIRTUAL_ID_MAP register of this bridge portal. Thus, the assigned virtual ID can be determined and only then will these devices be accessed to find out if they are bridge portals or not. Then the unique identifiers or EUI64 of the bridge portals can be obtained by analyzing the Read Block Request addressed to the bus information block of their configuration ROM (as was done previously on the local bus of the controller C).

At the step S9 the controller C obtains the route maps of the portals identified during the step S8. This information is contained in a response packet pertaining to a Read Block Request addressed to the ROUTE MAP CSR of the portal. The reachable buses are identified in the route map of the portal with a FORWARD flag in correspondence with the bus ID.

After the steps referenced 8 and 9 have been performed for all buses present in the net, the controller C has a fairly complete description of the net. What remains to be done is the association of each portal with its co-portal so that it knows which are the bridges between the buses.

At the step S10, the controller C obtains the list of portals and their corresponding route map (or the reachable_bus field of the portal descriptor, as it contains sufficient information to implement the remaining part of the algorithm) from its current net descriptor. Then, the controller creates a temporary descriptor of the list of portals in the net. This list will be completed in the rest of the algorithm. From this temporary descriptor, the controller selects the portals through which it is possible to reach only one bus (these buses are the leaves in the net topology).

In the exemplary net illustrated in FIG. 1, the controller selects the portals P2 (accessing the bus 912), P5 (accessing the bus 23) and P9 (accessing the bus 58).

At the step S13, the controller C defines the bus accessed by the current selected portal as the current bus.

At the step S14, the controller C identifies the active portal on the current bus (which can be accessed by the selected portal). An active portal is a portal that is not in a mute bridge (a mute bridge is a bridge that sends no asynchronous or isochronous packets). This means that its route map must contain a FORWARD flag at least for one bus ID entry. In the exemplary net shown in FIG. 1, for the bus 912 accessed by the portal P2, the active portal is referenced P1. The controller C can then associate the portals P1 and P2 as constituting one bridge, and can thus update the portal descriptor (in the current net descriptor) for the portals P1 and P2: the co_portal field of the descriptor of the portal P1 must point to the descriptor of the portal P2, and vice versa.

At the step S15, the controller C modifies the temporary descriptor so that the portals constituting the bridge identified during the step S14 are removed from the list of portals to be analyzed (they will be never again selected as current portals in the step S11). Furthermore, the corresponding leaf-constituting bus (912 in the example of the previous paragraph) is removed from the route maps of the as-yet-unprocessed portals. Thus, in the above-mentioned example, the route map of the portal P4 in the temporary descriptor, which was indicating that the buses 47 and 912 were being accessed by this portal, now indicates that only bus 47 is an accessed bus. This means that the portal P4 can be selected during step S10 (since this portal now makes it possible to reach only one bus).

Once the association between a portal and its co-portal is obtained, it remains valid for the entire lifetime of the net. This may not be the case for the bus numbering. This is why it appears to be more worthwhile to obtain a net descriptor consisting of a descriptor of portals pointing to the descriptor of their co-portals rather than a descriptor of portals pointing to the descriptor of their adjacent buses. It is clear, however, that the invention is applicable whatever the type of descriptor used.

Figure 4:
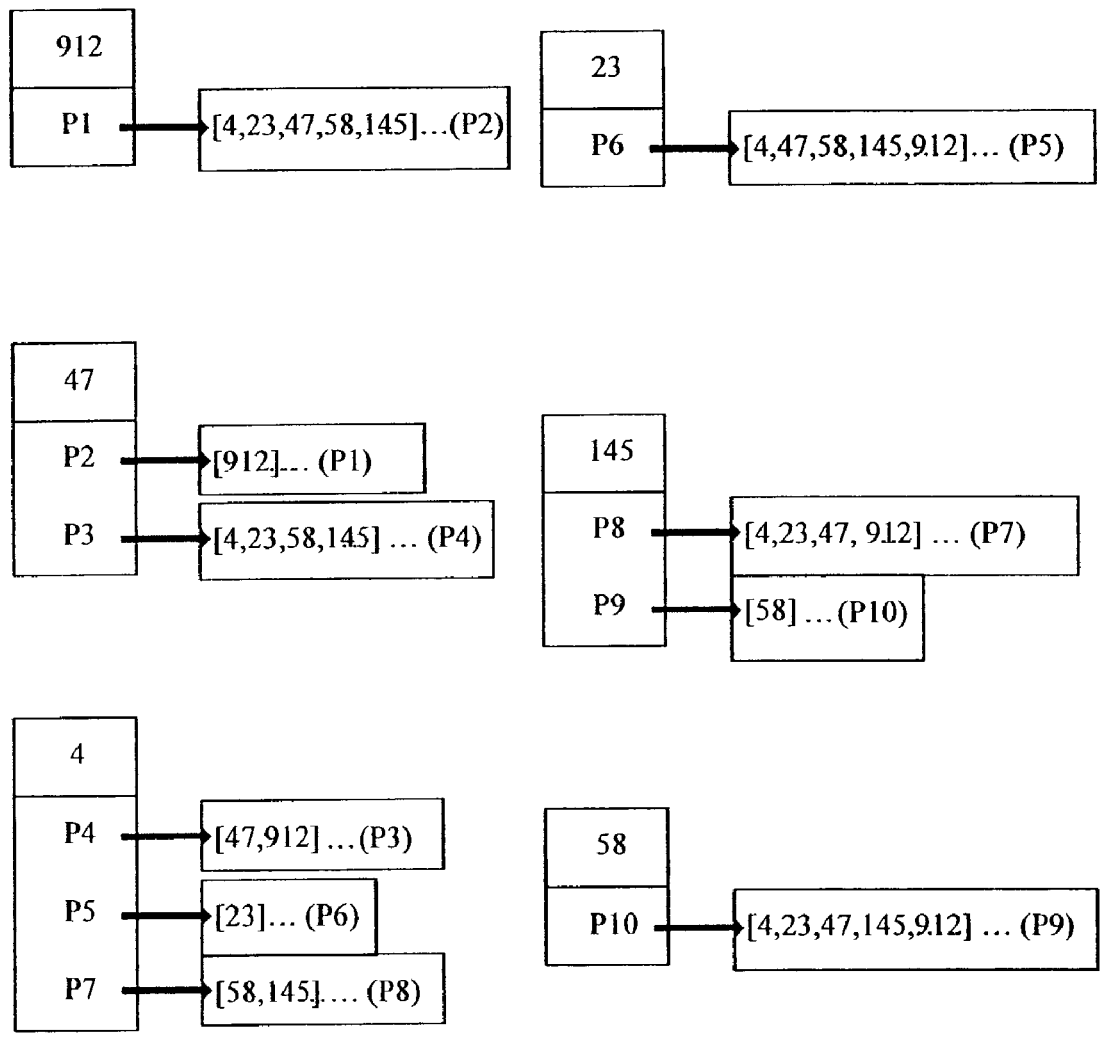
FIG. 4 illustrates a description of the homogeneous network of FIG. 1, obtained by the application of the algorithm of FIG. 3 to the homogeneous network of FIG. 1.

FIG. 4 illustrates a net descriptor obtained by applying the algorithm of FIG. 3 to the homogeneous net of FIG. 1.

In order to simplify FIG. 4 for each portal, the portal descriptor contains neither the unique identifier EUI64 nor the global node ID of this portal. It contains only the buses that can be accessed by this portal and the pointer to their co-portal.

The net descriptor contains six bus descriptors, one for each bus of the net. For example, one of the bus descriptors identifies the bus having the ID 47, with a list of two portals P2 and P3, P2 enabling access to the bus 912 with P1 as co-portal, and P3 enabling access to the buses 4, 23, 58 and 145 with P4 as co-portal.

This descriptor enables the controller C, when a stream connection is being set up, to know which are the bridges on the routing path between one bus to which the talker is connected and another bus to which the listener is connected.

Figure 5:
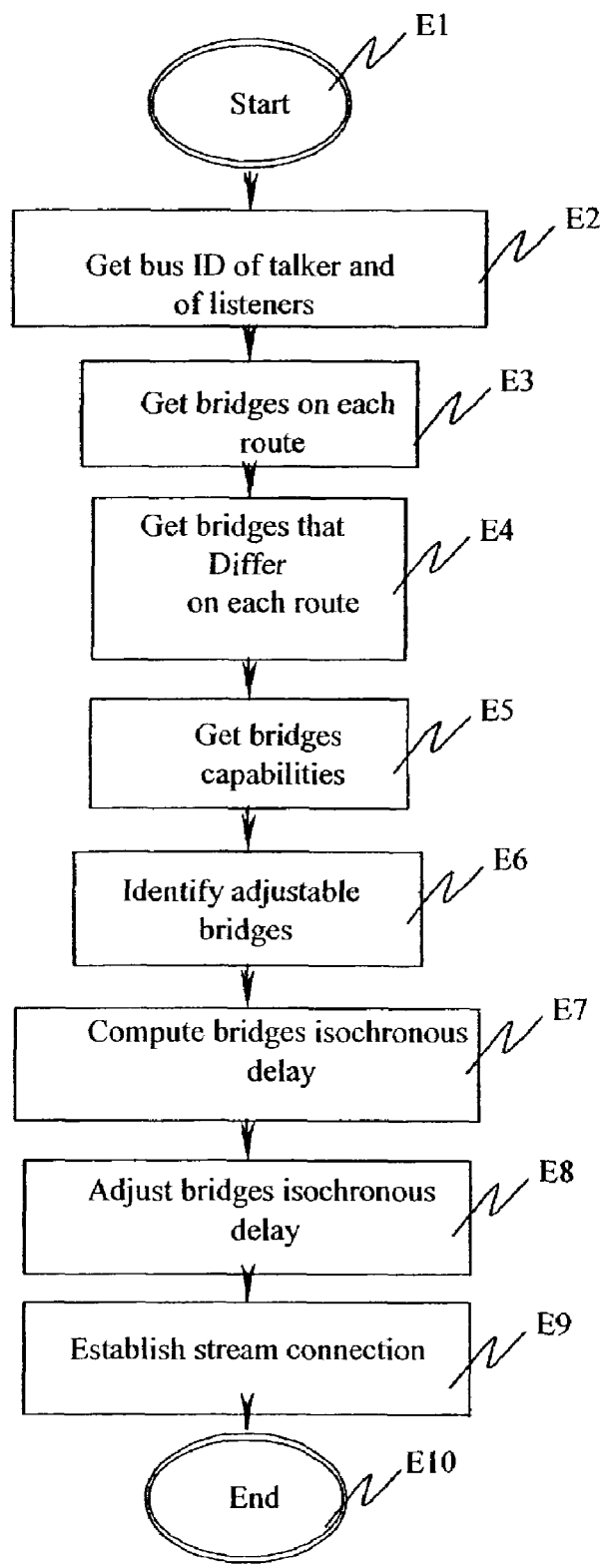
FIG. 5 presents an exemplary algorithm implemented by the controller contained in the homogeneous network of FIG. 1, in order to set up an isochronous data stream connection according to the method of the invention.

Referring to FIG. 5, we now present an exemplary algorithm implemented by the controller C in order to set up an isochronous data stream connection according to the method of the invention.

This algorithm is stored in the ROM of the controller C. It is loaded into the RAM of the controller C when the power is turned on and the central processing unit (CPU) of this controller will execute the corresponding instructions when it receives a stream commission request, requiring that the total isochronous delay between the talker and the listener(s)

should be equal to a predetermined value. If there are several listeners, the request requires for example that one and the same total isochronous delay should be applied between the talker and each listener.

At the step E1 the controller C receives a stream connection request as mentioned here above.

At the step E2 the controller C obtains the ID of the buses to which the talker and the listener(s) are connected. These pieces of information may be contained in the stream connection request itself, or may be obtained from the unique identifiers (EUI64) through the use of an EUI64 discovery message by the application of the DEP (Discovery and Enumeration Protocol) (see third standard mentioned here above).

At the step E3 the controller C uses its net descriptor (see discussion here above with reference to FIGS. 3 and 4) to obtain the bridges of each routing path between the talker and each listener.

The step referenced E4 is implemented only if there are several routing paths for which it is desired to have an identical total isochronous delay. In this case, within these routing paths, the controller C identifies the bridges that differ for each routing path.

At the step E5, the controller C obtains the capabilities of those bridges namely, for each crossing direction, the possible value or values of the isochronous delay of each bridge. This information may be contained in a response packet pertaining to a "Read Block Request" addressed to a bridge capability input of the configuration ROM of each portal.

At present, the IEEE 1394 standard (described in the third reference document cited here above) defines only one isochronous value per bridge, and per given direction of crossing this bridge, whatever the data stream that crosses this bridge.

The present invention introduces a new type of bridge with parametrizable isochronous delay that carries a range of values, into its configuration ROM, that it can apply for its isochronous delay.

The value of this isochronous delay may be adjusted in common for all the streams. This means that, once the parametrizable isochronous delay of the bridge has been adjusted, it can no longer be modified unless the bridge is reset or unless it receives a command requesting an updating of the value of its parametrizable isochronous delay. This case applies, for example, if the internal structure of the bridge has only one FIFO memory, for each crossing direction of the bridge; to temporarily store the isochronous packets.

According to one variant, for each bridge crossing direction, there is one FIFO memory per stream handled by the bridge portal. In this case, the parametrizable isochronous delay is modifiable for each stream handled by the bridge portal and is independent of the streams already handled (within the limit of the size of the internal memory of the bridge).

At the step E6 the controller C identifies those bridges, among the bridges obtained at the steps 3 and 4, that have parametrizable isochronous delays. The invention consists in computing a isochronous delay suited to these bridges to obtain a total isochronous delay with a predetermined value on the entire routing path or to make the total isochronous delays of the two routing paths identical.

At the step E7 the controller C computes the (parametrizable) isochronous delay for each bridge obtained at the step E6, so that:

the isochronous delay of the bridge is greater than or equal to its minimum value the isochronous delay of the bridge is smaller than or equal to its maximum value the sum of the isochronous delays of the bridges of the routing path between the talker and the listener is equal to a predetermined value. This predetermined value of the total isochronous delay must be greater than or equal to the minimum value applicable to the entire routing path and smaller than or equal to the maximum value applicable to the entire routing path.

At the step E8 the controller C informs the parametrizable isochronous delay bridges of the value that each bridge must apply for the concerned stream connection. This may be done by using a transaction based on a "lock request" or "write request" to a specific offset in the range of the CSR of the bridge (as already defined in the above mentioned standards for IEEE 1394 type transactions).

Each homogeneous parametrizable isochronous delay bridge plays on the threshold of its internal FIFO memory to modify the value of its isochronous delay. More specifically, in the case of a homogeneous net illustrated in FIG. 1, the homogeneous bridge with parametrizable isochronous delay instantiates its internal FIFO memory for the concerned stream so that it has a threshold such that the sum:

of the delay ($D_{bridge\ processing}$) incurred by the isochronous traffic in the bridge internal structure or fabric, and the delay ($D_{FIFO\ crossing}$) incurred by the isochronous traffic in crossing the FIFO memory (i.e. the time taken by the FIFO memory to reach its threshold $\Delta$) is equal to the isochronous delay defined by the controller C.

It may be recalled that the threshold of a FIFO memory corresponds to a quantity of data stored in this memory which, when it is reached, indicates that the reading of the data can begin.

At the step E9 the controller C sends the appropriate stream connection command through the net (a JOIN request as defined in the third standard mentioned here above).

At the step E10 the controller C ends the execution of the algorithm and may inform the stream connection requesting party (the user, another device for which it has acted as a proxy, etc.) about the status of that stream connection setting-up operation. This status is reported especially in the STREAM STATUS message returned to the controller C at the end of the stream connection as defined in the third standard mentioned here above.

It must be noted that the instantiation of the FIFO memory of a bridge with parametrizable isochronous delay, contained in the routing path between the talker and the listener, is preferably done during the stream connection phase (i.e. during the exchange of JOIN and LISTEN messages as defined in the third standard cited earlier and indicated here above with reference to the step E9). This is especially suited to the case where the bridges that handle the streams have distinct FIFO memories for the different streams. Indeed, the bridge may start computing the instantiation of a FIFO memory and reserve the required internal resources, and if a timeout (to be determined) expires before the stream connection message (as defined in the step E9) is received, the bridge releases the internal resources for other uses.

In another possibility, which also falls with the scope of the present invention, this instantiation is done directly when the bridge is informed by the controller of the value that it must apply (i.e. during the step E8)

Figure 6:
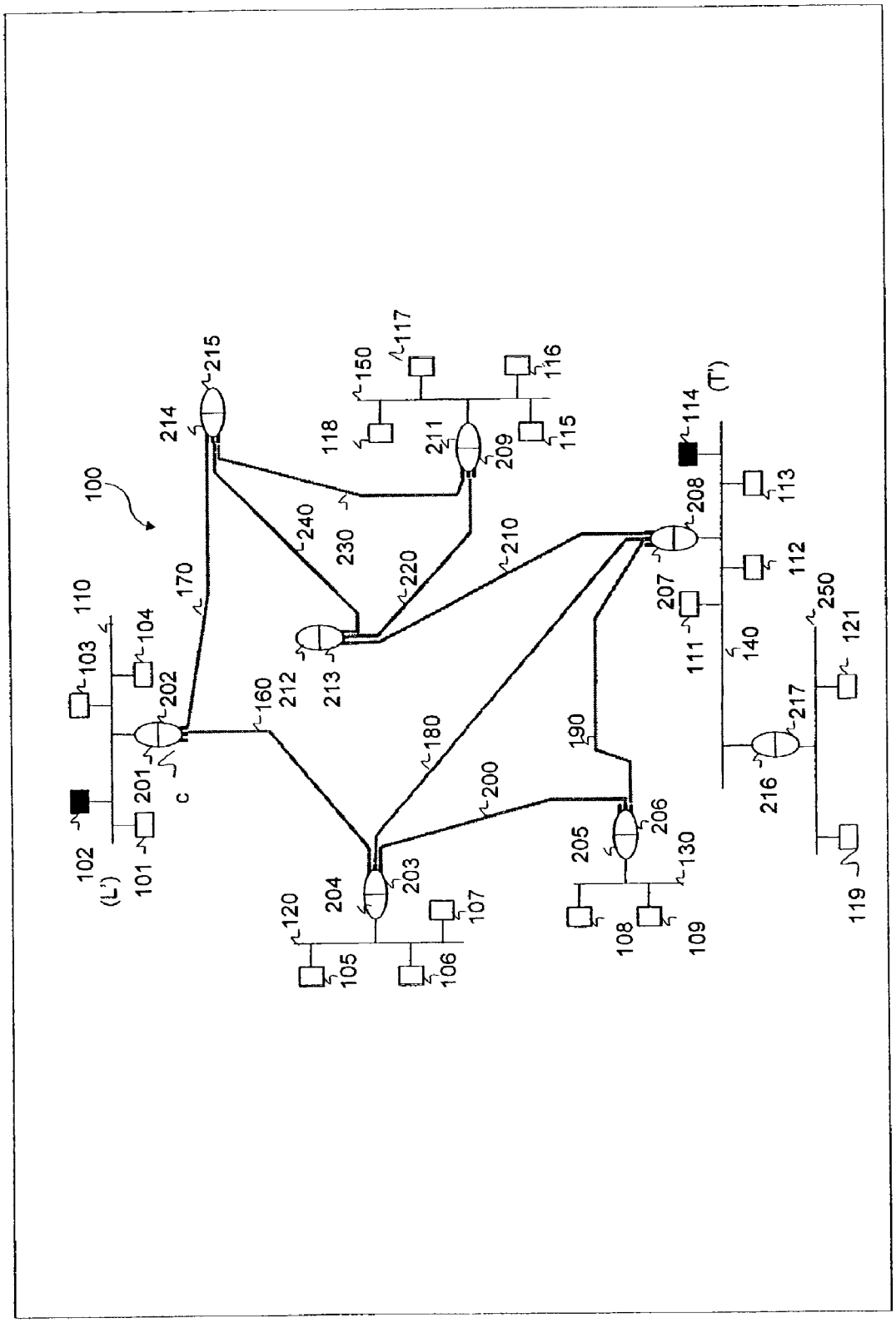
FIG. 6 shows a block diagram of exemplary heterogeneous network of digital buses, in which the method according to the invention can be implemented.

FIG. 6 presents an exemplary heterogeneous network of digital buses in which the method according to the invention can be implemented.

In this example, the heterogeneous network consists of a plurality of IEEE 1394 type buses referenced 110, 120, 130, 140, 150 and 250 interconnected to one another and/or to a switched network 100.

The bridge referenced 216/217 is a homogeneous bridge, interconnecting two IEEE 1394 type buses. An exemplary structure of a homogeneous bridge of this kind has been discussed and described in detail here above with reference to FIG. 2.

The interconnection of the switched network 100 and of the IEEE 1394 buses is achieved by means of heterogeneous bridges compliant with the third standard mentioned here above. They consist of two paired portals, 201/202, 203/204, 205/206, 207/208 and 209/211. A heterogeneous bridge referenced X/Y is constituted by portals themselves referenced X and Y. Each of these heterogeneous bridges therefore has a first portal connected to the switched network 100 and a second portal connected to an IEEE 1394 type digital bus. A detailed example of the structure of a heterogeneous bridge is shown here below with reference to FIG. 7.

The switched network 100 is seen as a serial bus by all the devices (terminals, homogeneous bridges, controller etc.) that do not belong to this switched network 100.

Terminals or devices, referenced 101 to 104 (on the bus referenced 110), 105 to 107 (on the bus referenced 120), 108 and 109 (on the bus referenced 130), 111 to 114 (on the bus referenced 140), 119 and 121 (on the bus referenced 250), 115 to 118 (on the bus referenced 150), are connected to the IEEE 1394 bus. They are compliant with the first and second standards referred to here above.

All the bridges of FIG. 6 play a role of resource reservation during the setting up of a stream connection, as is described in greater detail in the third standard mentioned here above. These bridges, on the routing path from a talker to at least one listener, interpret and exchange inter-bridge messages (for example: "JOIN", "LISTEN", "LEAVE" and "STREAM STATUS" type messages) as laid down by the IEEE 1294 standard. Such messages give information on the talker, the listener, the bandwidth needed to convey isochronous data and the stream connection set-up status.

The switched network 100 consists of links referenced 160, 170, 180, 190, 200, 210, 220, 230 and 240 which interconnect
 firstly nodes referenced 201/202, 203/204, 205/206, 207/208 and 209/211, also called heterogeneous bridges, interconnecting the switched network 100 with the IEEE 1394 bus, and
 secondly, nodes referenced 212/213 and 214/215, internal to the switched network 100.

Figure 7:
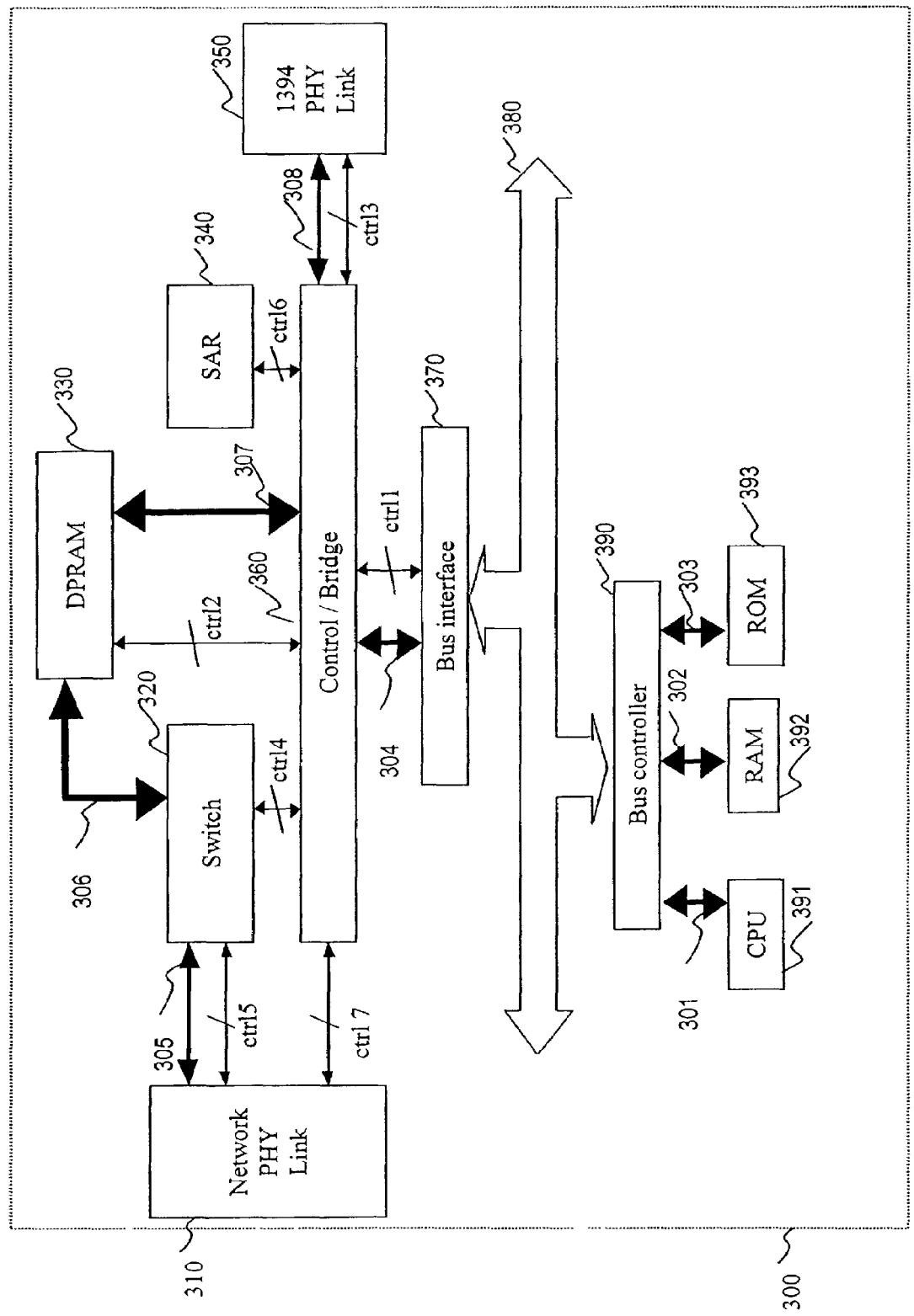
FIG. 7 illustrates an exemplary embodiment of a heterogeneous bridge contained in the heterogeneous network of FIG. 6.

The packet routing through the switched network 100 is achieved by implementing a source routing method, according to which the routing information of a packet is computed by a central processing unit or CPU, referenced 391 FIG. 7, that knows the topology of the switched network 100. This aspect shall not be described in greater detail in the context of the present invention.

Referring to FIG. 7, a description is now given of an exemplary structure of a heterogeneous bridge referenced 201/202, 203/204, 205/206, 207/208, 209/211, 2121/213 or 214/215 in FIG. 6.

A bridge of this kind has two communications interfaces: a first interface 350 with the IEEE 1394 bus and a second interface 310 with the switched network. The latter interface comprises for example a C113 type component manufactured by 4Links Ltd (registered mark), if the switched network relies on the "IEEE 1355-1995: Standard for Heterogeneous Interconnect (HIC)".

The switch 320 is used to transfer data from a first port to a second port of the interface of the switched network, receive data from an interface port of the switched network sent to the DPRAM 330 and transmit data from the DPRAM 330 to at least one port of the interface of the switched network (in this descending order of priority). The working of a switch 320 of this kind is described especially in the French patent application No. 01 02037 by the present applicant, not yet published on the filing date of the present application. Since such an operation is not part of the object of the present invention, it shall not be described in greater detail in this document.

The DPRAM 330 is laid out in a set of FIFO memories, used to transfer data from the IEEE 1394 interface 350 to the interface of the switched network 310 and vice versa. The management of the DPRAM 330 is provided by the control module 360, using control signals ctrl2.

The SAR module 340 is used for the segmentation and reassembly of data coming from and sent to the interface of the network 310. Thus, the IEEE 1294 type isochronous packets may be segmented with a view to their transmission on the switched network 100. The transfer of asynchronous packets does not form part of the present invention and shall therefore not be described in greater detail. Furthermore, the SAR 340 plays a planning role for the transmission of data on the network, in order to comply with the time constraints dictated by isochronous transfers.

The configuration of all the modules is done by the central processing unit or CPU 391 through the bus interface 370. The data and control exchanges between the Control/Bridge module 360 and the CPU 391 are done through the data interface 304 and the signals ctrl1, the bus interface 370 and the host bus 380.

The bridge module 360 comprises a first stream control table (also called a stream routing table) as specified in the "Standard for High Performance Serial Bus bridges" for communications on the IEEE 1394 interface 350. The bridge module 360, in correspondence with this first table, also maintains a second stream control table for communications with the switched network. Furthermore, the bridge module 360 is in charge of modifying the fields of the IEEE 1394 packets in order to transmit them on the IEEE 1394 (350) interface, and especially the fields pertaining to the bit rate; the channel taken by the packets; the time-related information (CIPs); information intended for the IEEE 1394 (350) interface pertaining to transmission speed.

Referring now to FIG. 8, we shall present a routing table for the switched network 100, contained in the RAM 392 of the portal 207 of the bridge 207/208. Similar tables are of course also stored in the RAMs of the other portals of the heterogeneous bridges. However, for simplicity's sake, hereinafter in the document we shall strive to describe more particularly the routing table of the portal referenced 207. A table of this kind is used to illustrate the determining of the routing path needed to set up a stream connection. The fields that are filled in the table of FIG. 8 provide a numerical example that shall be taken up hereinafter in the document When a bridge portal receives an inter-bridge message requesting the setting up of a stream connection, it must ascertain that the (virtual) bus identifier of the entry terminal or of the "talker" (if the bridge portal is a listener in the routing path) or the bus identifier of the addressee terminal or listener (if the bridge portal considered is a talker on the routing path) is still valid. If not, the stream connection cannot be set up. A piece of information such as this is contained in the routing map defined in the "IEEE P1394.1 draft 0.175 Standard for High Performance Serial Bus bridges". The management of this routing map is not part of the object of the present invention and shall therefore not be described in the present application. For further details, reference may be made to the above-mention standard.

The table shown in FIG. 8 sets up a correspondence between a bus identifier (represented by a value ranging from 0 to 0x3E.) the switched network node that will be the data forwarder, the routing path through the switched network 100 to reach this node and the bandwidth available on this routing path through the switched network.

The method of routing through the switched network 100 is for example a source routing method. The routing method implemented within the switched network does not form the object of the present invention. Reference may be made to the French patent application No. 01 02037 mentioned here above for a more detailed description of the processing of routing headers Several different routing paths may exist between two nodes of a switched network 100. To choose a preferred routing path, it is possible to consider taking certain selection criteria into account such as for example the direction of the stream within the switched network 100: thus for example, two different routing paths may be chosen to reach a node of the network, depending on whether this node is a talker or listener.

The bandwidth information for a given routing path through the switched network 100, which is contained in the table of FIG. 8, enables the node responsible for processing a stream connection set-up request to decide whether or not the current resources of the network can be used to set up the required stream connection.

The bandwidth allocation may be controlled, for example, by a leader node of the switched network 100, implementing a procedure called the "lock, compare and swap" procedure: the node wishing to allocate bandwidth sends a message to the leader node of the switched network 100 specifying the previous value of the bandwidth and the new value, taking account of the bandwidth reservation to be made.

This procedure ensures that the competing bandwidth allocation requests are not harmful to the table of description of the bandwidth of the network. The leader node will accept the bandwidth allocation requests only if the previous bandwidth value specified in the received message corresponds to the value contained in the description table of the leader node. The leader node may then initiate a response message destined for the sender of the request indicating the success of the transaction and/or it may use a broadcasting message informing all the nodes of the switched network 100 about the new bandwidth available.

Thus the value in the distributed tables of FIG. 8 may, at a given instant, be not exactly identical to the value contained in the description table of the leader node. In this case, the node that has sent a bandwidth request will use an inappropriate "old value" in the bandwidth allocation message, and the request will therefore be rejected by the leader node.

In order that its request may be accepted, the node requesting a bandwidth allocation must therefore obtain the new bandwidth value contained in the description table of the leader node: to do this, it may send out a request for reading the description table of the leader node or wait for reception of a broadcast message from the leader nodes informing all the nodes about the new bandwidth available on the switched network 100.

The choice of a leader node and its mode of operation are not the object of the present invention and shall therefore not be described in greater detail in the present application.

As indicated here above, the bandwidth information contained in the table of FIG. 8 enables a node processing a stream connection request to decide whether or not the current resources of the network enable the setting up of such a connection.

For example, according to the numerical example which shall be dealt with here below in the document, when the portal 207 of the bridge 207/208 tries to set up a connection for a listener terminal 102 or L' connected to the bus 110, it consults the table illustrated in FIG. 8. Using the identifier of the bus 110, it determines that it is necessary to reach the portal 202 of the bridge 201/202 in taking a routing path that goes through the nodes 213 and 214 of the switched network. This routing information provides information on the number of intermediate nodes to be crossed (two in the example described) within the switched network 100 to reach the heterogeneous bridge referenced 201/202. This information is particularly important for the computations that will be developed hereinafter in the document.

On the switched network 100, the routing path of a packet traveling from a first node to a second node may be congested in varying degrees. This congestion will depend on the data streams that cross the switch (referenced 320 in FIG. 7 discussed here above). In FIG. 7, the DPRAM 320 plays the role of a data buffer in order to counter the jitter of the network and ensure that:

there is always enough free space to write data in the transmission FIFO (Tx FIFO) by a write stream operation;

there is always enough data that has to be transmitted by scheduling in the transmission FIFO (Tx FIFO)

there is always enough free space in the reception FIFO (Rx FIFO) for the reassembling of data received from the network;

there is always enough data that has to be read by the reception FIFO (Rx FIFO), by a read stream operation.

Thus, the instantiation of the FIFO memory must take account of an estimation of the jitter of the switched network 100 in order to guarantee the conditions listed here above.

The switched network 100 is cadenced by means of a 49,152 MHz clock. The synchronization of all the nodes of the switched network 100 with this clock does not form part of the object of the present invention and shall not be described in greater detail in this document. A time slot on the switched network has a duration of 125 µs, as in the case of an IEEE 1394 type serial bus. The transfer of a packet on the network is set up as a function of the connections already existing within the network. Thus, at worst, a packet may be received by the addressee node at the start of a 125 µs cycle if there had been no congestion on any of the intermediate switches of the routing path, while the next packet will be received only at the end of the following 125 µs cycle owing to "bottlenecks" in certain intermediate switches. Consequently, the maximum value of the jitter of the network is 250 µs. A more precise estimation may be obtained by analyzing the behavior of the switched network 100 in the presence of concurrent data streams (by simulation, modeling the network and testing prototype performance) but a rough estimate of the jitter at 250 µs is enough to illustrate the present invention.

For an application requiring a data bit rate of 30 Mbps (for example a DV video format), the estimation of the size of the FIFO needed to counter-balance the jitter of the switched network 100 is the following:

$$L_{adapted\ FIFO} = \Delta + X = 2*\Delta = 2*\text{bit rate}*\text{jitter} = 2*30.10^6*250.10^{-6} = 1875 \text{ bytes} \approx 470 \text{ Quadlets}$$

As described hereinafter with reference to FIG. 4, A represents a first part of the FIFO memory called the threshold which the invention brings in to play in order to modify the value of the parametrizable isochronous delay. Furthermore, X represents a second part of the original FIFO memory used to counter the jitter of the network. In a preferred embodiment of the invention, X=Δ is chosen.

Figure 9:
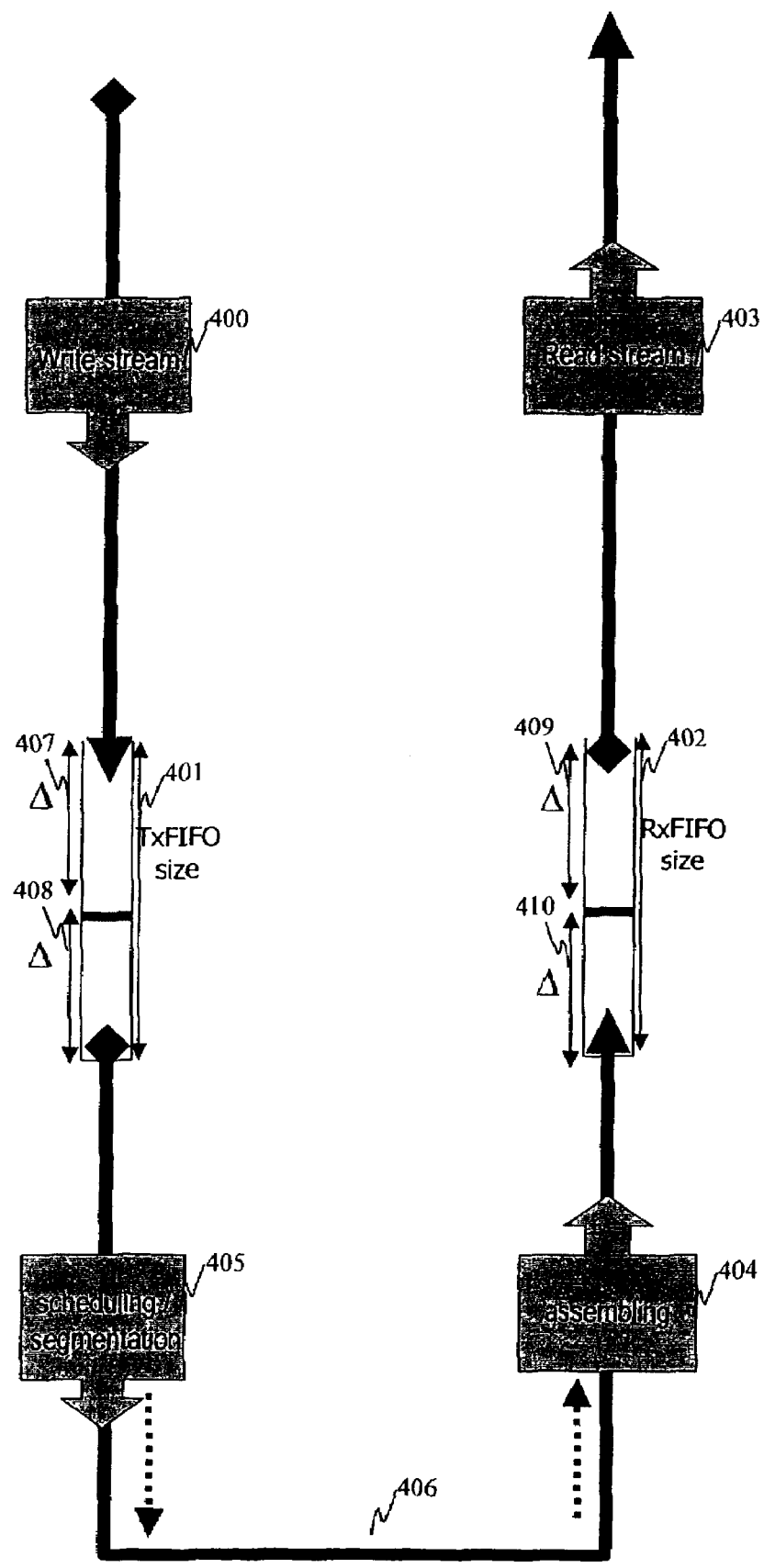
FIG. 9 illustrates the size of the original (namely pre-adaptation) FIFO memories of a talker heterogeneous bridge on the one hand and a listener heterogeneous bridge on the other hand, taking account of an estimation of the jitter of the network in a first embodiment of the invention.

FIG. 9 illustrates the size of the FIFO memories of two heterogeneous nodes respectively playing the role of talker bridge (namely the entry bridge of the switched network) and listener bridge (namely the exit bridge of the switched network) of a data stream, after estimation of the jitter of the switched network. These FIFO memories are instantiated in the DPRAM 330 and managed by the Control/Bridge module 360 of FIG. 2. The data is placed in the FIFO 401 by the bridge module 360, in order to be transferred on the switched network 100, in implementing a write operation 400. These data have to be segmented and scheduled by the SAR module 340 during a segmentation and scheduling operation 405.

The end-to-end routing path 406 may cross one or more intermediate nodes of the switched network 100. The jitter of the network introduces variations in the time needed for the end-to-end packet transmission and it is the role of the FIFO memories 401 and 402 of FIG. 4 to counter the jitter. The size L and the threshold Δ of the FIFO memories are determined by the central processing unit 391 after estimation of the jitter of the network as described here above.

Just as in the homogeneous network described here above with reference to FIG. 1, the device C, which is also a heterogeneous bridge 201/202, is a "controller" in charge of controlling the setting up of the isochronous data stream connection set-up, with a predetermined total isochronous delay. The working of this controller has already been explained in detail here before (with reference to FIGS. 1 to 5).

By way of an example, and as illustrated in FIG. 6, we shall consider the processing of an isochronous data stream connection request, from the talker terminal referenced 114 and T' (connected to the bus reference 140), to the listener terminal referenced 102 and L' (connected to the bus reference 110).

Just as in the case discussed here above of a homogeneous network, the goal is to give a predetermined value, when it is physically possible, to the total isochronous delay between the talker and the listener or listeners.

The controller C also implements the algorithm of FIG. 5, already described in detail here above in the case of a homogeneous net. In the present case of a heterogeneous net, the application of this algorithm has a few differences discussed here below.

At the step referenced E3, the controller C obtained the homogeneous bridges and/or the heterogeneous bridges of each routing path between the talker terminal and each listener terminal. Thus, in the above-mentioned example, the routing path between the talker T' and the listener L' comprises two heterogeneous bridges referenced 207/208 and 201/202 respectively.

It assumed in this example that the heterogeneous bridges referenced 207/208 and 201/202 are parametrizable isochronous delay bridges and are therefore identified as such during the step referenced E6.

During the step referenced E7, when it compute the parametrizable isochronous delay for each of the heterogeneous bridges obtained at the step E6, the controller C takes account of the delay introduced by the passage of the stream in the switched network.

For example, the delay introduced by the passage of the stream in the switched network (also called "latency time due to the switched network") is taken into account:

in a first proportion P1 of 50%, in the parametrizing isochronous delay of the heterogeneous bridge referenced 207/208, forming an entry node or talker node of the switched network;

in a second proportion P2 of 50%, in the parametrizing isochronous delay of the heterogeneous bridge referenced 201/202, forming an exit node or listener node of the switched network.

The delay $D_{switched\ network}$ introduced by the passage of the stream in the switched network is, for example, computed according to the following formula:

$$D_{switched\ network} = N_{intermediate\ nodes} \times D_{switching}$$

with $N_{intermediate\ nodes}$ being the number of intermediate nodes in the part of the routing path included in the switched net, and $D_{switching}$ being the mean switching time per intermediate node, which can be assessed by means of the network and switch models, by simulation and/or by carrying out prototype performance tests. We have, for example, $D_{switch}=30$ μs.

In the above-mentioned example, the part of the routing path included in the switched network comprises not only the heterogeneous bridges 207/208 and 201/202 (forming respectively entry and exit nodes of the switched network) but also the two intermediate nodes referenced 213 and 214. The latency time due to the switched network 100 is therefore equal here to 60 μs.

Each heterogeneous parametrizable, isochronous delay bridge plays on the threshold (Δ) of its internal FIFO memory to modify the value of its isochronous delay.

More specifically, in the case illustrated in FIG. 6 of a heterogeneous network, each of the heterogeneous parametrizable, isochronous delay bridges 201/202 and 207/208 instantiates its internal FIFO memory for the stream concerned, in such a way that it has a threshold (Δ) such that the sum of:

the delay ($D_{bridge\ processing}$) incurred by the isochronous traffic in the bridge internal structure or fabric, and the delay ($D_{FIFO\ crossing}$) incurred by the isochronous traffic in crossing the FIFO memory (i.e. the taken by the FIFO memory to reach its threshold Δ)

a part (proportion P1 or P2 mentioned here above) of the delay ($D_{switched\ network}$) introduced by the passage of the stream in the switched network, is equal to the isochronous delay defined by the controller for this heterogeneous parametrizable, isochronous delay bridge.

The delay ($D_{bridge\ processing}$) incurred by the isochronous traffic in the internal structure of the bridge is, for example, equal to 125 μs, in taking account of the time taken to recover data in the DPRAM, the packet header modification time, the time taken for transfer to the bus interface, and the time of synchronization with the IEEE 1394 local bus clock.

Figure 10:
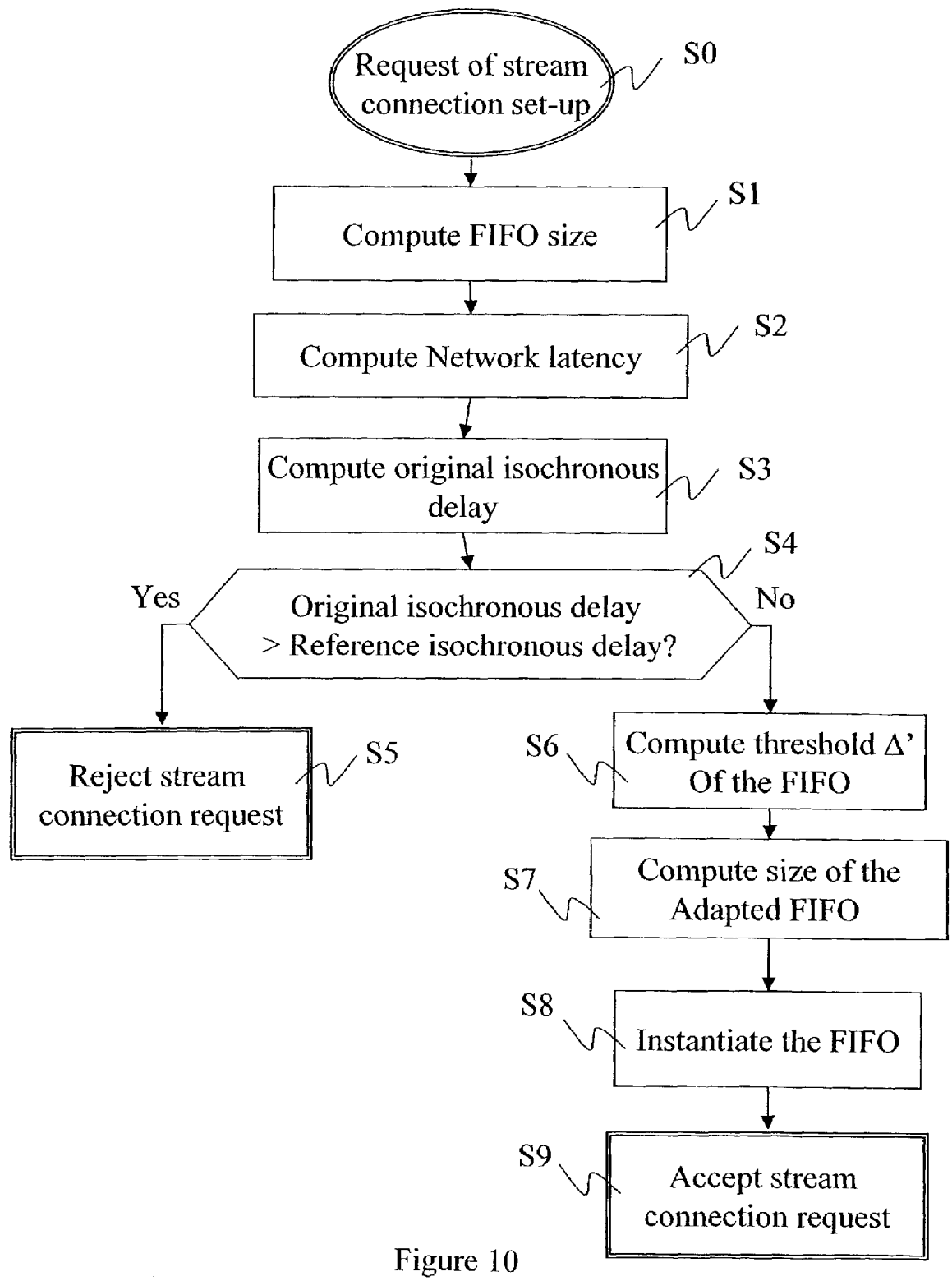
FIG. 10 shows the algorithm implemented in a first embodiment of the invention during a step of instantiation of the FIFO memories.
Figure 11:
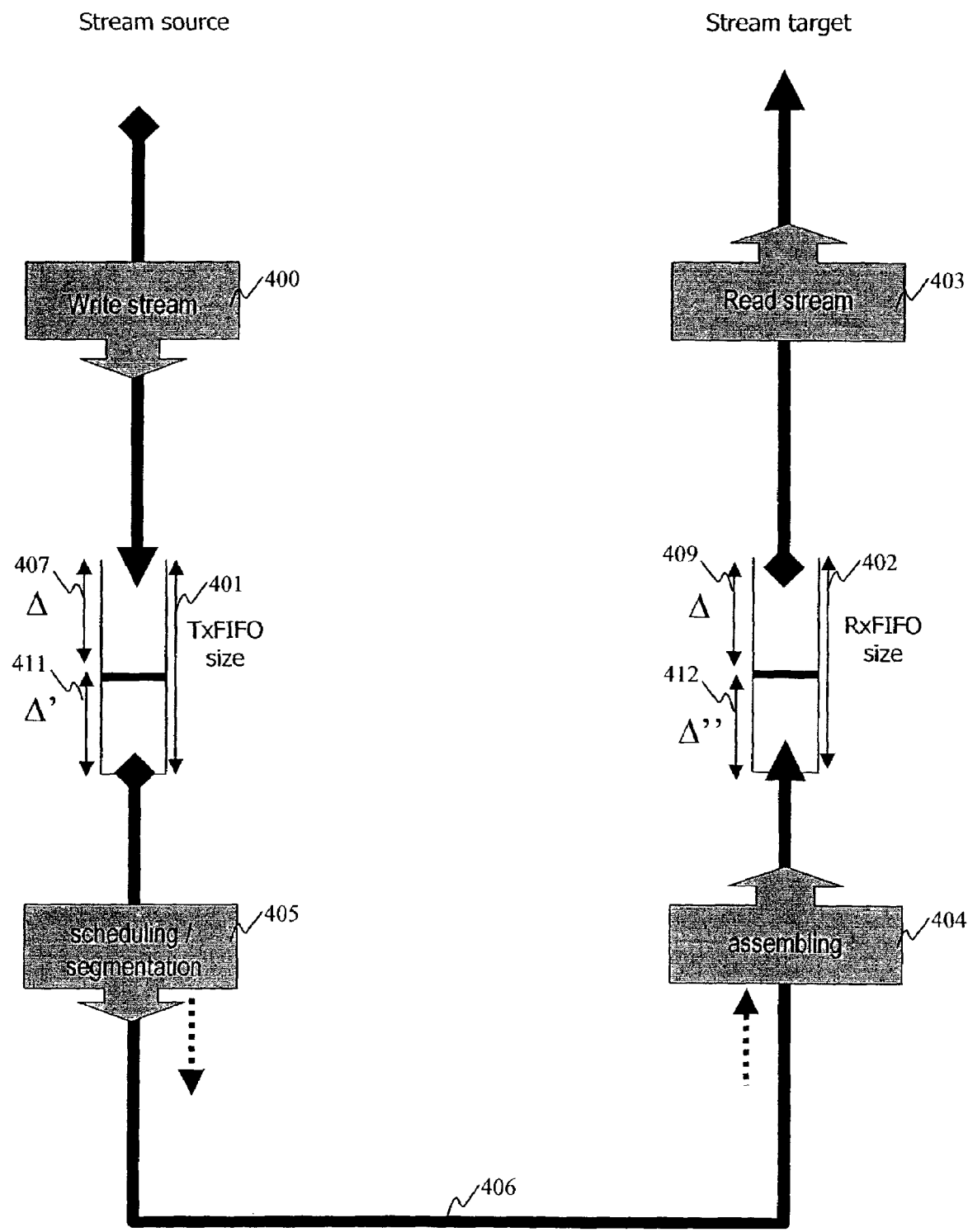
FIG. 11 illustrates the size of the adapted FIFO memories of a talker heterogeneous bridge on the one hand and a listener heterogeneous bridge of the other hand, after the adaptation of the isochronous delay to a reference isochronous delay in a first embodiment of the invention.

Referring now to FIGS. 10 and 11, we shall present a first embodiment of the invention in which the resources of the heterogeneous bridges of the network are modified so that the delay introduced during the transfer of a packet through the bridge is constant and substantially equal to ("lower than or equal to and as close as possible to") a reference delay, as laid down by the IEEE 1394 standard defined in the IEEE "Standard for High Performance Serial Bus bridges".

FIG. 10 presents an algorithm implemented by a heterogeneous bridge of the switched network 100 (playing the role of the controller C mentioned here above) upon reception of a stream connection set-up request. This algorithm is stored in the ROM of the heterogeneous bridge. It is loaded into the RAM when the power is turned on and the central processing unit (CPU) 391 will execute the corresponding instructions.

During a step referenced S0, one of the heterogeneous bridges referenced 201/202, 203/204, 205/206, 207/208 or 209/211 receives and interprets a stream connection set-up request.

During a step referenced S1, the size of the original FIFO memory (namely the size of the memory Tx FIFO for a heterogeneous bridge playing the role of talker and the size of the memory are Rx FIFO for a heterogeneous bridge playing the role of listener) is computed according to the method described here above.

During a step referenced S2, the delay introduced by the passage of the stream along the routing path is then computed:

$$D_{switched\ network} = N_{intermediate\ nodes} \times D_{switching},$$

Where $N_{intermediate\ nodes}$ is the number of intermediate nodes along the routing path, and where $D_{switching}$ is the mean switching delay per node.

If we consider that the talker heterogeneous bridge and the listener heterogeneous bridge must each take account of the delay $D_{switched\ network}$ in a proportion of 50 percent, then for each of these two bridges we have:

$$D_{switched\ network/bridge} = D_{switched\ network}/2$$

During a step referenced S3, the original isochronous delay due to the configuration of the network is computed:

$$D_{original\ isochronous} = D_{switched\ network/bridge} + D_{original\ FIFO\ crossing} + D_{bridge\ processing}$$

With $D_{original\ FIFO\ crossing} = \Delta/\text{Bit rate}_{stream}$ where $\Delta$ represents a first part of the FIFO, called an original threshold of the FIFO.

In the case of a listener heterogeneous bridge, the delay $D_{bridge\ processing}$ corresponds to the sum of the delay undergone by the isochronous packets when they are transferred from the Rx FIFO of the listener heterogeneous node to the IEEE 1394 interface 350 of this same bridge and of the processing time taken by the bridge module 360. In the case of a talker heterogeneous bridge, the delay $D_{bridge\ processing}$ corresponds to the sum of the time lag incurred by the isochronous packets when they are transferred from the IEEE 1394 interface 350 to the Tx FIFO of the talker heterogeneous bridge and the processing time taken bridge module 360 of this heterogeneous bridge.

During a step referenced S4, the original isochronous delay $D_{original\ isochronous}$ is compared with the predetermined reference isochronous delay indicated in the ROM of the configuration, called CONFIG ROM, of the portal of the heterogeneous bridge considered, as specified in the "Standard for High Performance Serial Bus bridges".

If the original isochronous delay is greater than the reference isochronous delay, the setting up of the stream connection is rejected (S5).

By contrast, if the original isochronous delay is smaller than or equal to the reference isochronous delay, the new threshold $\Delta'$ of the FIFO during a step referenced S6 is determined:

$$\Delta' = \Delta + \delta$$

where $\Delta$ is the original threshold of the FIFO, and where $\delta$ is the greatest integer such that $\delta \leq \delta_{max}$, with:

$$\delta_{max} = \text{Bit rate}_{stream} \times (D_{reference\ isochronous} - D_{original\ isochronous})$$

During a step referenced S7, the size $L_{adapted\ FIFO}$ of the FIFO memory is then determined:

$$L_{adapted\ FIFO} = \Delta' + X$$

Now, the size $L_{original\ FIFO}$ of the original FIFO memory is given by:

$L_{original\ FIFO} = \Delta + X$, with, classically $\Delta = X$.

Therefore $L_{adapted\ FIFO} = \Delta' + L_{original\ FIFO}/2$.

During a step referenced S8, the FIFO is instantiated. The central processing unit 391 gives the Bridge/Control module 360 the parameters pertaining to the stream considered, which have been listed and computed beforehand.

During a step referenced S9, the stream connection set-up request is accepted by the bridge portal concerned, and the stream connection set-up procedure may continue as specified in the "Standard for High Performance Serial Bus bridges".

FIG. 11 illustrates the size of the FIFO memories, Rx FIFO and Tx FIFO, of the talker and listener heterogeneous bridges after the adapting of the value of the isochronous delay of the bridge, in a given crossing direction, to the reference isochronous delay for a given stream connection according to a determined routing path within the switched network 100.

We shall now resume the above-mentioned example of a stream connection from the terminal referenced 114 (talker T') to the terminal referenced 102 (addressee terminal L') of FIG. 1, for a 30 Mbps application. We shall consider the routing path going from the portal 207 of the heterogeneous bridge 207/208 to the portal 202 of the bridge 201/202 according to a routing path that passes by the portals 213 and 214 of the heterogeneous bridges 212/213 and 214/215.

If we apply the algorithm of FIG. 5 to the portal 207, which processes the stream connection described here above, the computation of the size of the original FIFO needed to counter the jitter of the switched network 100, performed during the step referenced S1, gives $L_{original\ FIFO} = 470$ Quadlets as computed here above.

The mean latency time of a switch may be evaluated by means of the network and switch models, by simulation and/or by carrying out prototype performance tests. For example, a value of this kind may be equal to 30 μs. The routing path from the heterogeneous bridge 207/208 to the heterogeneous bridge 201/202 goes through two intermediate nodes as described here above. Hence the latency time due to the switched network 100 is equal to 60 μs.

This delay is shared between the heterogeneous bridge 207/208 and the heterogeneous bridge 201/202. If it is considered that these two bridges take account of an identical proportion of the latency time of the network (namely 50%), it may be considered that the latency time of the network that must be taken into account by the portal 207 is equal to 30 μs. The portal 207 of the bridge 207/208 computes this value for the portal 208, which constitutes a listener portal on the routing path linking the terminal referenced 114 to the terminal referenced 102.

It will be noted that the "IEEE P1394.1 Draft 0.17 Standard for High Performance Serial Bus bridges" specifies that the addition of the isochronous delay into the isochronous delay field of the message LISTEN must be done by the "listener" portals on the routing path that goes from the "talker" terminal 114 to the listener terminal 102.

The original isochronous delay, for the stream connection described here above, and assuming a transfer delay, within the heterogeneous bridge, $D_{bridge\ processing}$, equal to 125 μs for example (taking account of the data retrieval time in the DPRAM, the packet header modification time, the transfer time to the bus interface and the synchronization time with the clock of the IEEE 1394 local bus), is therefore equal to:

$$D_{original\ isochronous} = 30\ \mu s + (470\ Quadlets/2)/30\ Mbps + 125\ \mu s = 406\ \mu s,$$

which corresponds approximately to 3,25 cycles of 125 μs.

If the fixed reference isochronous delay in the configurations ROM of the portal 208 of the bridge 207/208 is equal to 5, the comparison of the step reference S4 in FIG. 5 leads to a negative response, and it is therefore possible to compute the new threshold Δ' of the FIFO as follows:

$$\Delta' = ((5*125\ \mu s) - 30\ \mu s - 125\ \mu s)*30\ Mbps \approx 440\ Quadlets.$$

The reference isochronous delay specified in the configuration ROM of the portal of the heterogeneous bridge is constructor dependent and may be determined by carrying out simulations, using models, or carrying out constructor prototype performance tests Thus, the new FIFO size, called $L_{adapted\ FIFO}$, of the portal 207 of the bridge 207/208 is equal to:

$$L_{adapted\ FIFO} = \Delta' + X,$$

and when $$L_{original\ FIFO} = \Delta + X = 2\Delta,$$

we have:

$$L_{adapted\ FIFO} = \Delta' + L_{original\ FIFO}/2 = 440 + 235 = 675\ Quadlets$$

The same procedure can be implemented for the portal 202 of the heterogeneous bridge 201/202, which is the next listener bridge portal on the routing path from the talker terminal 114 to the listener terminal 102, when the portal 207 transfers a message LISTEN to set up the stream connection. The portal 202 of the heterogeneous bridge 201/202 therefore, in the computation of its adapted FIFO memory size, will integrate the part of the isochronous delay undergone by the packets during their transfer into the switched network 100 which was not taken into account by the portal 207 of the heterogeneous bridge 207/208 during its own computation of adapted FIFO size.

Thus, as shown in FIG. 6, we have for the portal 202:

$L_{adapted\ FIFO} = \Delta'' + X$, where X is the second part of the original FIFO memory of the portal 202.

It will be noted that Δ" and Δ' may or may not have equal values: indeed, the transfer time within the heterogeneous bridge $D_{bridge\ processing}$ may vary as a function of the bridge crossing direction.

Here below, with reference to FIGS. 12 to 14, we present a second embodiment of the invention, also in the case of a heterogeneous network of digital buses.

Unlike the first embodiment described here above (with reference to FIGS. 9 to 11), this second embodiment does not conform to the "Standard for High Performance Serial Bus bridges". However, it has the advantage of consuming less memory.

The goal of this second embodiment is not to apply a constant isochronous delay for any stream crossing a heterogeneous bridge. On the contrary, the isochronous delay undergone by isochronous packets crossing a heterogeneous bridge henceforth depends on the stream to which they belong, this dependence being chiefly related to the routing path that they take within the switched network 100 (namely the number of intermediate nodes located along this routing path) as well as the jitter of the network (in the case of a refined computation and not the choice of an arbitrary value for the isochronous delay) and the bit rate of the stream.

The following are the situations requiring knowledge of the isochronous delay value associated with a given stream, for a given bridge crossing direction:

setting up a stream connection (especially in the message LISTEN as described here above);

a CIP processing (as described in the introduction to this document;

a request for reading the bus configuration ROM containing the isochronous delay field, as described in the "Standard for High Performance Serial Bus bridges".

We consider first of all the case of a CIP packet processing described in the "Standard for High Performance Serial Bus bridges". As in the context of a stream connection set-up procedure, one isochronous delay is applied per stream: the listener portal of the heterogeneous bridge considered adds especially its own isochronous delay into the syt field of the CIP header.

With the stream dealt with being clearly identified, it is possible to use an isochronous delay adapted to the delay being dealt with, and there is then no ambiguity about the value of the isochronous delay to be added, this delay having been computed during the setting up a stream connection, and stored in association with the identifier of the stream. With the identifier of the stream being known, it is possible to retrieve the previously computed isochronous delay value.

Here below, referring to FIG. 12, we shall consider the case of a request for reading the isochronous delay. When an isochronous delay read request is received (200) by the CPU (391) managing the configuration ROM of a portal, this portal must decide on the response to be sent to the sender of the request.

In the first embodiment of the invention, according to the "Standard for High Performance Serial Bus bridges", there was no possible ambiguity whatsoever for the portals of the heterogeneous bridges since all the isochronous packets underwent the same isochronous delay: a portal therefore responded to an isochronous delay read request by indicating the isochronous delay common to all the streams for a given direction of crossing of this portal.

Figure 12:
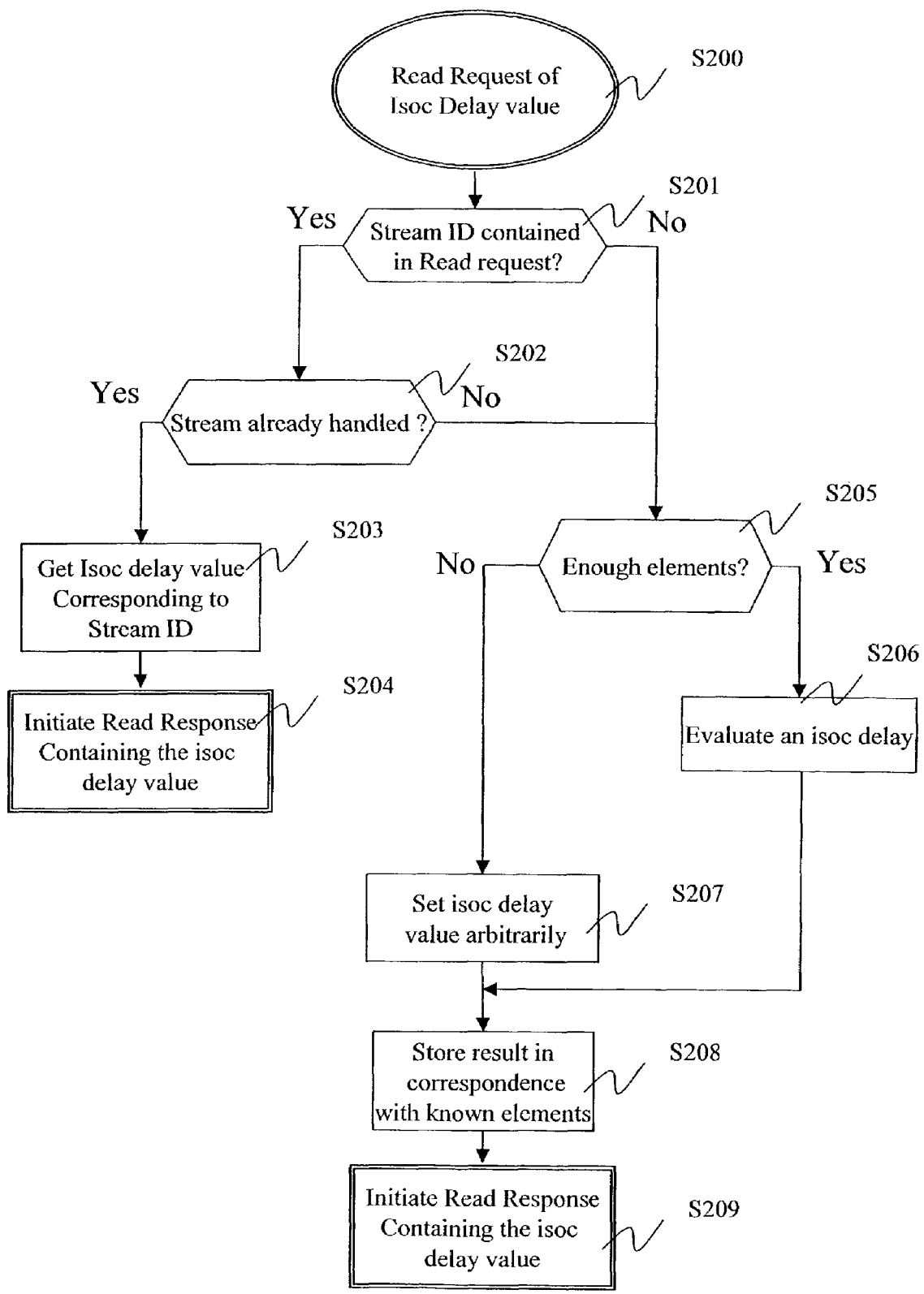
FIG. 12 gives a view, in a second exemplary embodiment of the invention, of an algorithm implemented by a heterogeneous bridge, upon reception of a request for reading the value of isochronous delay of the bridge portal considered.

In this second embodiment of the invention, on the contrary, since the isochronous delay is dependent on the stream, the portal of the heterogeneous bridge must implement a specific processing operation upon reception of an isochronous delay read request as shown by the algorithm of FIG. 12.

This algorithm is stored in the ROM of the heterogeneous bridge. It is loaded into the RAM when the system is powered on and the central processing unit (CPU) 391 will execute the corresponding instructions.

During a step referenced S201, the heterogeneous bridge considered determines whether a stream identifier is contained in the read request.

If the answer is affirmative, it then verifies (S202) whether the stream identifier corresponds to a current stream. If so, the heterogeneous bridge will read (S203) in memory the original isochronous delay computed beforehand for this stream, and stored in association with the identified stream. It then sends a response S204 containing the original isochronous delay to the sender of the read request.

Thus, if the read request is a message that can be interpreted by the portal of the heterogeneous bridge and if this message, in any one of its fields, contains a stream identifier, and if this stream identifier points to a stream that is in the course of being managed by the heterogeneous bridge considered, then there is no ambiguity and the bridge portal considered may send a response S204 containing the isochronous delay value characteristic of the stream considered.

If, on the contrary, a negative response is given to the response S202 (namely if the identified stream is not being managed by the heterogeneous bridge considered), the next step S205 of the algorithm of FIG. 12 consists in determining if the elements indispensable to the computation of an original isochronous delay are in the read request.

Similarly, if during the step reference to S201, it is ascertained that the read request does not contain any stream identifier, the operation goes to the step referenced S205 designed to identify the presence, within the read request, of computation elements indispensable to the computation of an original isochronous delay.

If the isochronous delay read request contains such elements indispensable to the computation of an original isochronous delay, the heterogeneous bridge (S206) computes an original isochronous delay and then goes to the step referenced S208 for the storage of the isochronous delay computed in association with the stream considered.

If, on the contrary, the read request contains no such computation elements, the heterogeneous bridge (S207) arbitrarily sets an original isochronous delay value and stores (S208) the arbitrarily fixed isochronous delay value in association with the stream considered. The arbitrary value chosen by default is for example the value contained in the memory CONFIG ROM.

During a step referenced S209, the heterogeneous bridge considered then sends a response containing the stored isochronous delay to the sender of the read request.

Thus, if the isochronous delay read request constitutes a message that can be interpreted by the portal of the heterogeneous bridge, and if this message, in any one of its fields, contains a sufficient number of elements to evaluate an isochronous delay on the network, then the bridge portal acted upon carries out this kind of evaluation S206 according to the computation method described with reference to the first embodiment of the invention, without however instantiating transfer means (especially threshold and size of the FIFO).

The terms "sufficient elements" herein mean that at least the identifier of the listener is known when the bridge portal acted upon (the portal 208 in the example dealt with here above) is paired with the talker portal (the portal 207 in the example described here above) within the switched network 100. Should the portal acted upon (the portal 202 in the example dealt with here above) constitute the listener portal of the stream within the switched network, these terms signify that at least the identifier of the talker is known.

If these elements are not known, it is possible to choose an arbitrary value S207. Such a value may chosen, for example, by the constructor of the bridge, from simulations of the network, models and/or prototype performance tests.

So that it can be subsequently reused, the isochronous delay value, computed or arbitrarily fixed, is preferably stored in association with characteristics of the corresponding stream.

The portal acted upon may then send a response S209 containing the computed or arbitrarily fixed isochronous delay value. The portal sending such a response stores the original isochronous delay indicated in its response to the read request, and tries to apply it to the following stream connection set-up procedures involving a "listener" and/or a "talker" having the identifier specified in the original read request and taking the same routing path.

If the read request contains no element by which it is possible to determine the purposes for which the sender of the request wishes to know the isochronous delay value of the portal acted upon, this portal may send back an error message in its response to the request so as not to give the sender of the request an arbitrary isochronous delay value that could compromise the future working of the network of the invention.

It is important to know that if the topology of the switched network changes dynamically (which means that the nodes of the switched network show what are called "hot-plugging" characteristics), it is recommended that the controller seeking to set up a stream connection should, during its stream connection set-up procedure, ask for confirmation of the isochronous delay value, when this value has been required by means of the read request sent to the configuration ROM of the bridge portal considered.

The term "controller" is understood here to mean a node using inter-bridge messages to set up or close a path for a data stream between a talker and a listener.

Finally, we shall consider the case of the setting up of a stream connection. It may be recalled that, according to the "Standard for High Performance Serial Bus bridges", when an isochronous stream connection is being set up, the controller who requests the connection sends a message of the type JOIN to the terminal bus to which the listener is connected. This message is intercepted by the terminal portal (namely the portal of the bridge connected to the terminal bus on the routing path to the listener), which analyses it, carries out the necessary processing operations, modifies it and then sends it to the initiator of the stream, namely the talker.

All the portals located on the routing path leading to the talker intercept the message and perform the necessary processing operations. Starting from the message JOIN, the terminal portal on the routing path leading to the talker generates a message LISTEN, in order to set up a full connection between the talker and the listener. The listener portals located on the routing path from the talker to the listener must increase the value contained in the isochronous delay field of the message LISTEN (as described with reference to the first embodiment of the invention) by the value of the delay undergone by the isochronous packets during the crossing of the bridge.

It will be noted that, according to the "Standard for High Performance Serial Bus bridges", the stream connection set-up procedure uses inter-bridge messages containing an identifier of the stream concerned. To deal with such a situation, it is not necessary to have an isochronous delay common to all the streams: it is possible to apply a distinct isochronous delay for each stream crossing the bridge.

Here below, with reference to FIGS. 13a, 13b and 14, we shall describe the different algorithms that can be implemented by a heterogeneous bridge upon reception of a stream connection set-up request according to the second embodiment of the invention.

These algorithms are stored in the ROM of the heterogeneous bridge. They are loaded into the RAM when the power is turned on and a central processing unit (CPU) 391 will execute the corresponding instructions.

When the portal of a heterogeneous bridge receives (S300) a connection set-up request for a stream identifier for which it has already generated a response to a read request, as described with reference to FIG. 12, it implements one of the algorithms of FIGS. 13a and 13b, to accept or refuse the requested setting up of the stream connection. One of these algorithms must be implemented at each stream connection request involving one of the elements stored during a step referenced S208 of FIG. 12.

Figure 13A:
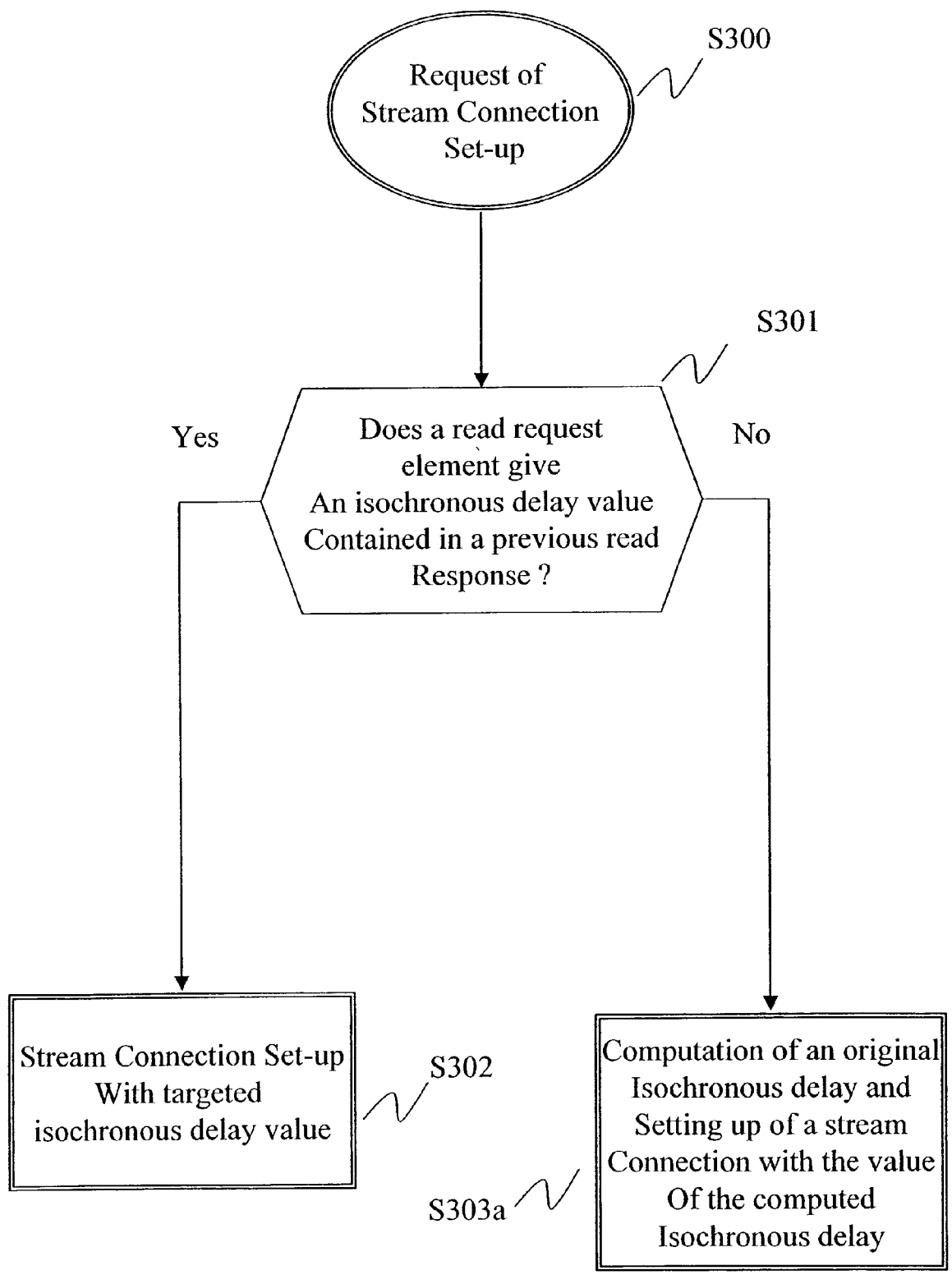
FIGS. 13a and 13b illustrate two algorithms that can be implemented by a heterogeneous bridge upon reception of a stream connection set-up request for which the bridge considered has generated a response beforehand to a read request, in this second embodiment of the invention.
Figure 13B:
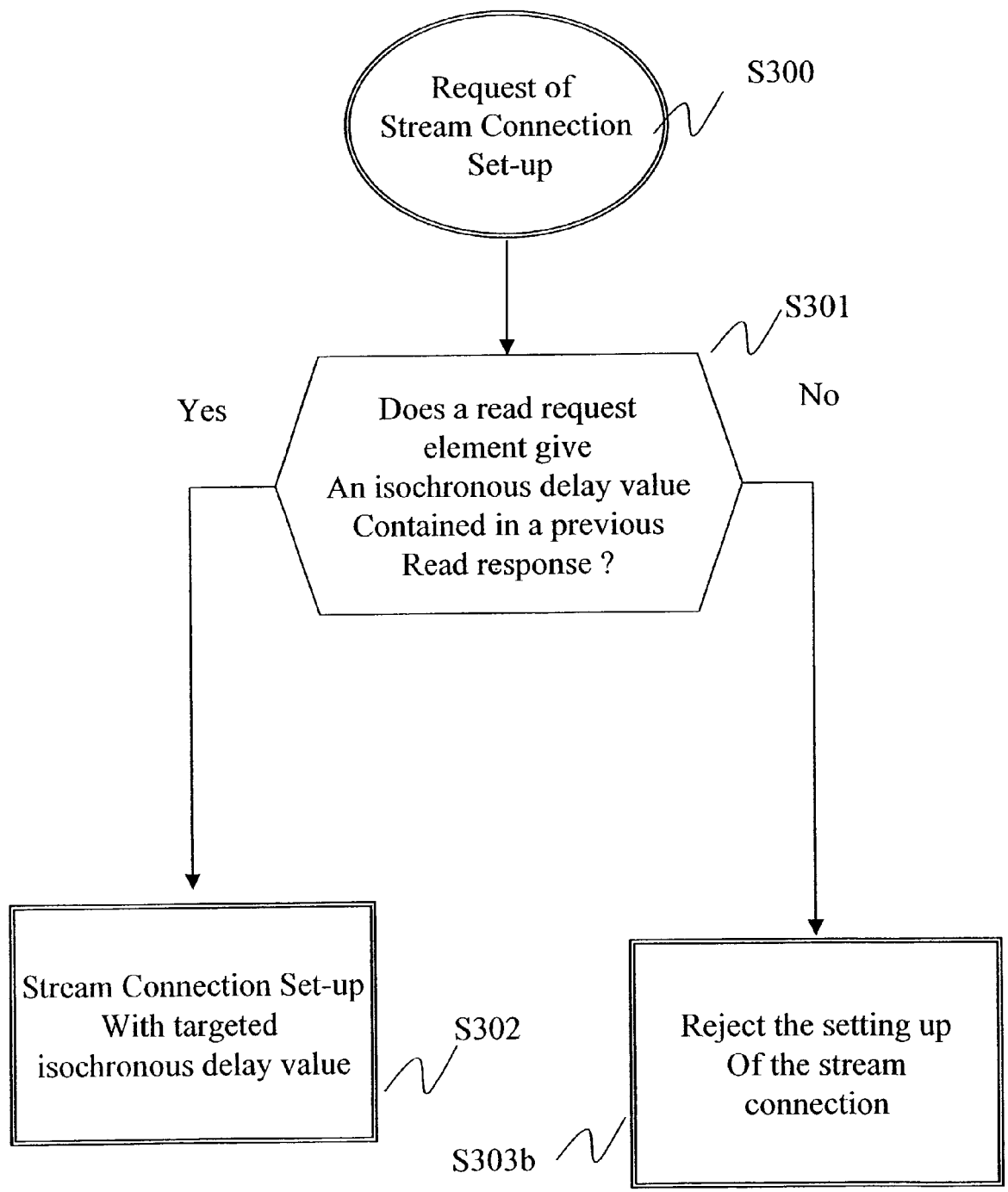

During a step referenced S301 common to FIGS. 13a and 13b, the heterogeneous bridge determines whether, in the stream connection set-up request received, there are elements that can be used to obtain an isochronous delay value that would have been inserted beforehand in a response to the read request for this stream. Thus, if the stream connection set up request contains a stream identifier managed beforehand by the heterogeneous bridge and for which the bridge has generated a response to a read request containing an isochronous delay value (computed or chosen arbitrarily for example), the heterogeneous bridge may extract, from its memory, the isochronous delay value stored beforehand in association with the stream identifier.

An isochronous delay value of this kind, stored and read in memory by the heterogeneous bridge, may then be used during the setting up (S302) of the stream connection by this bridge.

If, on the contrary, the stream connection set up request S300 pertains to a flow for which the heterogeneous bridge has carried out a prior generation of a response to an isochronous delay read request, but if this delay cannot be read for lack of elements in the stream connection set-up request (response "no" to the step referenced S301 of FIGS. 13a and 13b), the heterogeneous bridge may implement either of the steps referenced S303a and S303b of FIGS. 13a and 13b respectively.

Thus, according to a first alternative embodiment, the heterogeneous bridge, during a step referenced S303a, may decide to compute an original isochronous delay for the stream considered if it has sufficient elements to do so, and according to the computation technique already described above in this document. It then accepts the setting up of stream connection with the value of the original isochronous delay that it has just computed.

For example, the heterogeneous bridge accepts the setting up of the stream connection, indicates the new isochronous delay value computed in a LISTEN message and goes into a state of waiting for a request for confirmation of the isochronous delay value by the sender of the stream connection set-up request. It will be noted that, according to the "Standard for High Performance Serial Bus bridges", the controller that originates the setting up of the stream connection receives a STREAM STATUS message containing the isochronous delay undergone by the packets throughout the routing path from the entry terminal or talker to the addressee terminal or listener. This isochronous delay value may be compared to the expected isochronous delay value and, in the event of a difference between these two values, the controller can request confirmation of the isochronous delay value of each of the heterogeneous bridges of the network, and then decide to maintain the stream connection set up or put an end to it.

According to a second alternative embodiment, when there is no known isochronous delay value, the heterogeneous bridge may also decide to reject the setting up of the stream connection during a step referenced S303b in FIG. 13b.

For example, in case of a modification of the topology of the network after the generation by the heterogeneous bridge of an isochronous delay read response, the value of the isochronous delay sent beforehand in the response may be made obsolete. This may therefore lead the bridge to decide to reject the setting up of the stream connection, as described here above with reference to the step S5 in FIG. 10, and erase the value of the isochronous delay that had been stored during the step referenced S208 of FIG. 12. The next isochronous delay read request of the next stream connection set-up operation for the stream considered will make it possible to set up a new isochronous delay value more suited to the new configuration of the switched network 100.

Here below, with reference to FIG. 14, we shall describe the processing applied in a heterogeneous bridge upon reception of a request for setting up a stream connection for a stream that has not been processed beforehand by the bridge.

During a step referenced S100, the heterogeneous bridge receives a stream connection set-up request.

During a step referenced S101, the heterogeneous bridge considered then computes the size of the original FIFO, as described here above with reference to FIG. 10. The heterogeneous bridge then computes (S102) the latency time of the network and then computes and stores (S103) the original isochronous delay for the stream considered. It then instantiates (104) the FIFO and accepts (S105) the setting up of the stream connection with the original isochronous delay computed and memorized.

Figure 14:
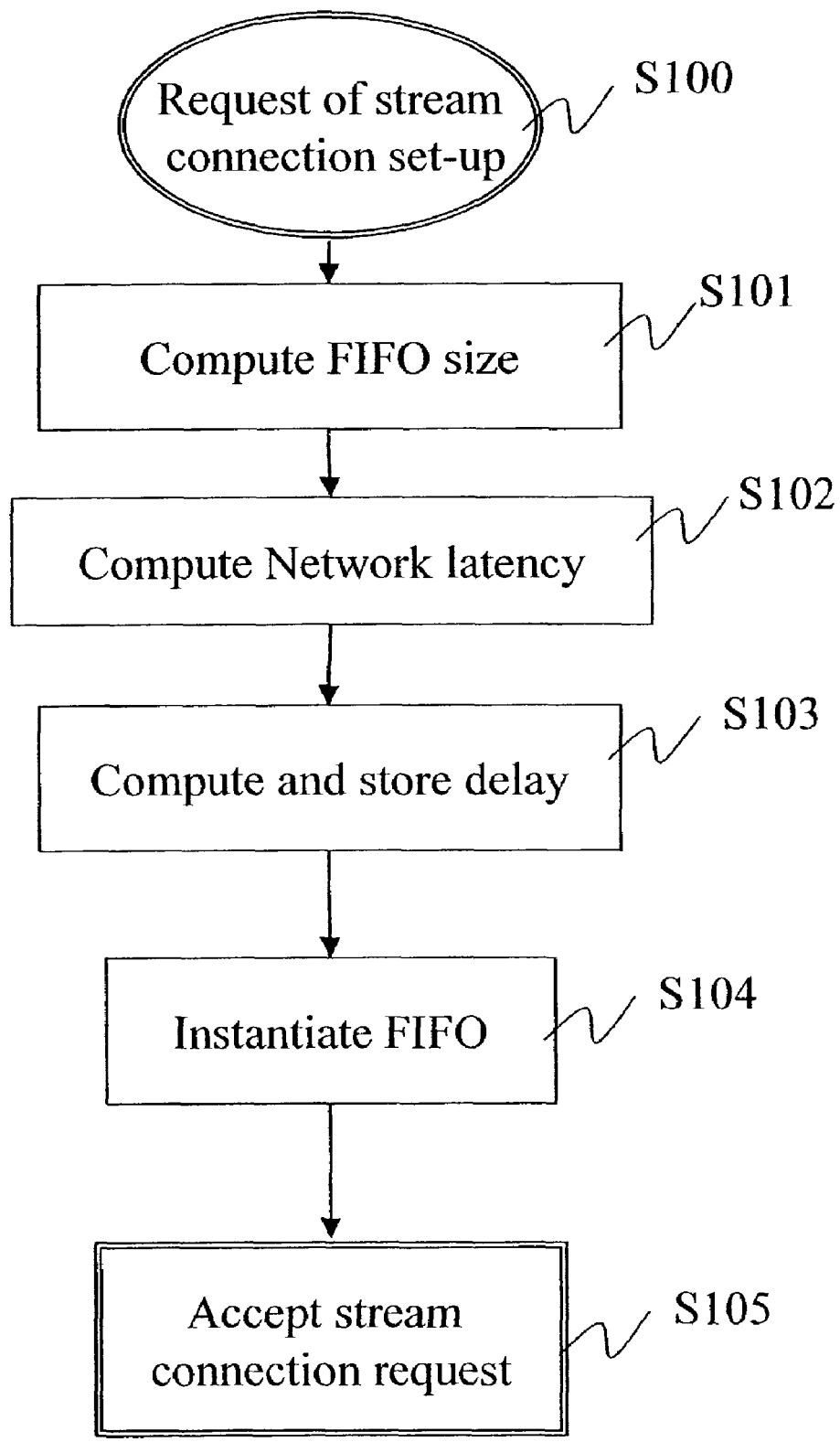
FIG. 14 describes the algorithm applied by a heterogeneous bridge according to the second embodiment of the invention in the case of the setting up of a stream connection for which the heterogeneous bridge considered has not computed any original isochronous delay beforehand.

Thus, the original isochronous delay computed and used in the framework of the algorithms of FIG. 14 is optimized with respect to the routing path of the stream through the switched network 100.

What is claimed is

1. A method for setting up an isochronous data stream connection between a talker terminal and at least two listener terminals in a network comprising a plurality of digital buses interconnected by a plurality of bridges, wherein each bridge is associated with an isochronous delay, wherein at least some of said bridges are associated with an isochronous delay that is parametrizable within a range of predetermined values, wherein the method comprises the following steps:

(a) obtaining the identity of bridges belonging to each routing path between the talker terminal and each listener terminal;
   (b) identifying the bridges that do not belong to multiple routing paths among the routing paths between the talker terminal and the listener terminals;
   (c) determining bridges with parametrizable isochronous delay among the bridges identified in step (b);
   (d) selecting a value for the isochronous delay of at least one of the bridges determined in step (c), so as to make the total isochronous delays of the routing paths identical;
   (e) adapting at least one resource of said at least one of the bridges determined in step (c), so that the parametrizable isochronous delay of said bridge takes said selected value.

2. A method according to claim 1, wherein said adapted resource is a FIFO memory included in said at least one of the bridges determined in step (c).

3. A method according to claim 1, wherein the adaptation of the resource is common to several streams so that the selected value of the parametrizable isochronous delay of said bridge is applied to each of said streams by said bridge.

4. A method according to claim 1, wherein the adaptation of the resource is specific to a particular stream so that the selected value of the parametrizable isochronous delay of said bridge is applied solely to said particular stream by said bridge.

5. A method according to claim 1, wherein said digital buses are IEEE 1394 digital buses.

6. A method according to claim 1, wherein said steps (a) to (d) are performed by a device that controls the setting up of a stream connection.

7. A method according to claim 1, further comprising a step to obtain a description of the network, wherein during said step (a), said description of the network is used to obtain the identity of the bridges belonging to each routing path.

8. A method according to claim 1, wherein the method is implemented for each crossing direction of each bridge included in each routing path.

9. A method according to claim 1, wherein said network is a homogeneous network, wherein the digital buses are interconnected directly through homogeneous bridges, each bridge comprising a first portal and a second portal, to each of which one of the digital buses is connected, and wherein each routing path between the talker terminal and one of the listener terminals comprises at least one homogeneous bridge with parametrizable isochronous delay.

10. A method according to claim 1, wherein said network is a heterogeneous network, and wherein the digital buses are interconnected either directly, through homogeneous bridges each comprising a first portal and a second portal, to each of which one of the digital buses is connected, or through at least one switched network, through heterogeneous bridges, each comprising a first portal to which one of the digital buses is connected and a second portal to which the switched network is connected, wherein the switched network comprises a plurality of nodes interconnected by a plurality of links, and wherein each heterogeneous bridge forms one of the nodes of the switched network;

wherein at least one of said routing paths crosses the switched network and comprises at least one pair of heterogeneous bridges respectively forming entry and exit nodes of the switched network, and wherein said at least one of said routing paths optionally also comprises at least one homogeneous bridge, wherein said at least one of said routing paths comprises at least one heterogeneous bridge with parametrizable isochronous delay or at least one homogeneous bridge with parametrizable isochronous delay, and wherein said at least one heterogenous bridge or said at least one homogenous bridge takes into account, in its parametrizable isochronous delay, of a determined proportion of a delay introduced by the passage of the stream in the switched network.

11. A method according to claim 10, wherein the delay introduced by the passage of the stream in the switched network is taken into account in a first proportion in the parametrizing isochronous delay of one of said heterogeneous bridges forming an entry node of the switched network, and in a second proportion in the parametrizing isochronous delay of the other of the heterogeneous bridges forming an exit node of the switched network, wherein the sum of the first and second proportions is substantially equal to 100%.

12. A method according to claim 11, wherein said first and second proportions are both substantially equal to 50%.

13. A method according to claim 10 wherein the delay obtained by the passage of the stream in the switched network is obtained by taking account of the routing path through the switched network.

14. A method according to claim 13 wherein the delay $D_{switched\ network}$ introduced by the passage of the stream in the switched network is computed by the following formula:

$$D_{switched\ network} = N_{intermediate\ nodes} \times D_{switching}$$

with $N_{intermediate\ nodes}$ being the number of intermediate nodes in the part of the routing path included in the switched net, and $D_{switching}$ being the mean switching time per intermediate node.

15. A method according to claim 10 wherein the delay introduced by the passage of the stream in the switched network is estimated by a predetermined value, without taking account of the routing path of the stream through the switched network.

16. A method according to claim 10 wherein said at least one of said routing paths comprises a heterogenous bridge with a parametrizable isochronous delay, and wherein the method further includes the step of:

memorizing the selected value of the parametrizable isochronous delay in said at least one heterogenous bridge of said at least one routing path, in association with a stream for which the setting up of a connection necessitates the selection of said selected value.

17. A method according to claim 16 wherein, in the case of a processing of a request for the reading of the isochronous delay, said at least one heterogeneous bridge with parametrizable isochronous delay tries to read the read request and in particular a stream identifier that may be included in the request, and if the read request contains a stream identifier which indicates a stream that is in the process of being managed by the heterogeneous bridge, then the heterogeneous bridge reads, from a memory, an isochronous delay computed beforehand and stored in association with the identified stream, and then sends a response containing the isochronous delay read.

18. A method according to claim 16 wherein, in the case of a processing of a request for the reading of the isochronous delay, said at least one heterogeneous bridge with parametrizable isochronous delay tries to read the read request and in particular a stream identifier that may be included in the request, and if the read request contains a stream identifier which indicates a stream that is not in the process of being managed by the heterogeneous bridge, or if the read request does not contain a stream identifier, then the heterogeneous bridge tries to identify computation elements, within the read request, that are indispensable to the computation of an isochronous delay, and if the read request contains the computation elements, the heterogeneous bridge computes an isochronous delay, stores it in association with the identified stream and then sends a response containing the isochronous delay computed.

19. A method according to claim 16 wherein, in the case of a processing of a request for the reading of the isochronous delay, said at least one heterogeneous bridge with parametrizable isochronous delay
  tries to read the read request and in particular a stream identifier that may be included in the request, and
  if the read request contains a stream identifier which indicates a stream that is not in the process of being managed by the heterogeneous bridge, or if the read request does not contain a stream identifier, then the heterogeneous bridge tries to identify computation elements, within the read request, that are indispensable to the computation of an isochronous delay,
  and if the read request does not contain the computation elements, the heterogeneous bridge chooses an isochronous delay having a predetermined value, stores it in association with the identified stream and then sends a response containing the isochronous delay chosen.

20. A device to control the setting up of an isochronous data stream connection between a talker terminal and at least two listener terminals in a network comprising a plurality of digital buses interconnected by a plurality of bridges, wherein each bridge is associated with an isochronous delay, wherein at least some of said bridges are associated with an isochronous delay that is parametrizable within a range of predetermined values, and wherein said control device comprises:
  obtaining means for obtaining the identity of bridges belonging to each routing path between the talker terminal and each listener terminal;
  identification means for identifying the bridges that do not belong to multiple routing paths among the routing paths between the talker terminal and the listener terminals;
  determination means for determining bridges with a parameterizable isochronous delay among the bridges identified by said identification means;
  selection means for selecting a value for the isochronous delay of at least one of the bridges determined by said determination means, so as to make the total isochronous delays of said routing paths identical;
  adaption means for adapting at least one resource of said at least one of the bridges determined by said determining means, so that the parametrizable isochronous delay of said bridge takes said selected value.

21. A device according to claim 20 wherein said adapted resource is a FIFO memory included in said at least one of the bridges determined by said determination means.

22. A device according to claim 20 wherein the adaptation means is common to several streams so that the selected value of the of the parametrizable isochronous delay of said bridge is applied to each of said streams by said bridge.

23. A device according to claim 20 wherein the adaptation means is specific to a particular stream so that the selected value of the parametrizable isochronous delay of said bridge is applied solely to said particular stream by said bridge.

24. A device according to claim 20 wherein said digital buses are IEEE 1394 digital buses.

25. A device according to claim 20 further comprising means for acquiring a description of the network,
  wherein said obtaining means uses said description of the network to obtain bridges belonging to each routing path.

26. A device according to claim 20 wherein the device which can be used for each crossing direction of each bridge included in each routing path.

27. A device according to claim 20 wherein said network is a homogeneous network, wherein the digital buses are interconnected directly through homogeneous bridges, each comprising a first portal and a second portal, to each of which one of the digital buses is connected,
  and wherein said at least one routing path between the talker terminal and one of the listener terminals comprises at least one homogeneous bridge with parametrizable isochronous delay.

28. A device according to claim 20, wherein said network is a heterogeneous network, and wherein the digital buses are interconnected
  either directly, through homogeneous bridges each comprising a first portal and a second portal, to each of which one of the digital buses is connected,
  or through at least one switched network, through heterogeneous bridges, each comprising a first portal to which one of the digital buses is connected, and a second portal, to which the switched network is connected wherein the switched network comprises a plurality of nodes interconnected by a plurality of links, wherein each heterogeneous bridge forms one of the nodes of the switched network.
  wherein at least one of said routing paths crosses the switched network and comprises at least one pair of heterogeneous bridges, respectively forming entry and exit nodes of the switched network and wherein said at least one of said routing paths optionally also comprises at least one homogeneous bridge,
  wherein said at least one of said routing paths comprises at least one heterogeneous bridge with parametrizable isochronous delay or at least one homogeneous bridge with parametrizable isochronous delay, and wherein said at least one heterogenous bridge or said at least one homogenous bridge takes into account, in its parametrizable isochronous delay, of a determined proportion of a delay introduced by the passage of the stream in the switched network.

29. A device according to claim 28, wherein said selection means is such that the delay introduced by the passage of the stream in the switched network is taken into account
  in a first proportion in the parametrizing isochronous delay of one of said heterogeneous bridges forming an entry node of the switched network, and
  in a second proportion in the parametrizing isochronous delay of the other of the heterogeneous bridges forming an exit node of the switched network,
  wherein the sum of the first and second proportions is substantially equal to 100%.

30. A device according to claim 29 wherein said first and second proportions are both substantially equal to 50%.

31. A device according to claim 28, wherein the delay obtained by the passage of the stream in the switched network is obtained in taking account of the routing path through the switched network.

32. A device according to claim 31 wherein the delay $D_{switched\ network}$ introduced by the passage of the stream in the switched network is computed by the following formula:

$$D_{switched\ network} = N_{intermediate\ nodes} \times D_{switching}$$

with N intermediate nodes being the number of intermediate nodes in the part of the routing path included in the switched net,
  and $D_{switching}$ being the mean switching time per intermediate node.

33. A device according to claim 28, wherein the delay introduced by the passage of the stream in the switched network is estimated by a predetermined value, without taking account of the routing path of the stream through the switched network.

34. A computer-readable storage medium storing a set of computer-executable instructions, wherein said set of computer-executable instruction are executable by a computer to perform the steps of the method of any one of claims 1, 2 to 5, 8 to 17, 22 and 24 to 26.

* * * * *

UNITED STATES PATENT AND TRADEMARK OFFICE
CERTIFICATE OF CORRECTION

PATENT NO. : 7,269,137 B2
APPLICATION NO. : 10/216782
DATED : September 11, 2007
INVENTOR(S) : Stephane Bizet et al.

It is certified that error appears in the above-identified patent and that said Letters Patent is hereby corrected as shown below:

TITLE PAGE ITEM 57 IN THE ABSTRACT:
      Line 4, "networ." should read -- network. --.

COLUMN 2:
      Line 41, "for" should read -- a -- (second occurrence); and
      Line 53, Delete "included along the" (first occurrence).

COLUMN 3:
      Line 4, "path is generally comprise" should read -- paths generally comprise --; and
      Line 5, "not" should read -- nor --.

COLUMN 5:
      Line 10, Delete "of the" (second occurrence).

COLUMN 8:
      Line 3, "avec" should read -- with --;
      Line 4, Delete "*origine*";
      Line 25, "$D_{isochrone}$," should read -- $D_{isochronous}$, --; and
      Line 41, "this" should read -- these --.

COLUMN 9:
      Line 37, "heterogeneous" should read -- heterogeneous bridge --.

COLUMN 10:
      Line 23, "heterogeneous" should read -- heterogeneous bridge --.

COLUMN 12:
      Line 31, "seconds" should read -- second --; and
      Line 56, "seconds obtention," should read -- second obtention means, --.

COLUMN 13:
      Line 2, Delete "of the" second occurrence; and
      Line 21, Delete "is used".

COLUMN 16:
      Line 55, "EUI164" should read -- EUI64 --.

COLUMN 17:
      Line 27, "request":" should read -- request") --.

UNITED STATES PATENT AND TRADEMARK OFFICE
CERTIFICATE OF CORRECTION

PATENT NO. : 7,269,137 B2
APPLICATION NO. : 10/216782
DATED : September 11, 2007
INVENTOR(S) : Stephane Bizet et al.

It is certified that error appears in the above-identified patent and that said Letters Patent is hereby corrected as shown below:

COLUMN 21:
        Line 38, "IEEE 1294 standard." should read -- IEEE 1394 standard. --;
        Line 53, "391 FIG. 7," should read -- 391 in FIG. 7, --; and
        Line 59, "2121/213" should read -- 212/213 --.

COLUMN 22:
        Line 20, "EEEE 1294" should read -- IEEE 1394 --; and
        Line 67, "draft 0.175" should read -- draft 0.17 --.

COLUMN 23:
        Line 62, "nodes" should read -- node --.

COLUMN 25:
        Line 1, "A" should read -- $\Delta$ --.

COLUMN 26:
        Line 45, "(i.e. the" should read -- (i.e., the time --.

COLUMN 27:
        Line 17, Delete "are"; and
        Line 56, "taken" should read -- taken by the --.

COLUMN 29:
        Line 19, "3,25 cycles" should read -- 3.25 cycles --.

COLUMN 31:
        Line 65, "may" should read -- may be --.

COLUMN 37:
        Line 42, "adaption" should read -- adaptation --; and
        Line 66, Delete "which".

COLUMN 38:
        Line 23, "network." should read -- network, --.

UNITED STATES PATENT AND TRADEMARK OFFICE
CERTIFICATE OF CORRECTION

PATENT NO. : 7,269,137 B2
APPLICATION NO. : 10/216782
DATED : September 11, 2007
INVENTOR(S) : Stephane Bizet et al.

It is certified that error appears in the above-identified patent and that said Letters Patent is hereby corrected as shown below:

COLUMN 40:
Line 2, "claims 1, 2 to" should read -- claims 1 to 19. --; and
Line 3, Delete entire line.

Signed and Sealed this

Eighteenth Day of August, 2009

David J. Kappos
*Director of the United States Patent and Trademark Office*